(12) United States Patent
Wetsch et al.

(10) Patent No.: US 9,977,423 B2
(45) Date of Patent: May 22, 2018

(54) REWIND QUEUE FEATURE FOR PROTECTIVE PACKAGING CONTROL

(71) Applicant: Pregis Intellipack LLC, Deerfield, IL (US)

(72) Inventors: Thomas D. Wetsch, St. Charles, IL (US); George Bertram, Southbury, CT (US); Edward Eisenberger, Waterbury, CT (US)

(73) Assignee: Pregis Intellipack LLC, Deerfeld, IL (US)

( * ) Notice: Subject to any disclaimer, the term of this patent is extended or adjusted under 35 U.S.C. 154(b) by 0 days. days.

(21) Appl. No.: 15/390,261

(22) Filed: Dec. 23, 2016

(65) Prior Publication Data
US 2017/0185075 A1    Jun. 29, 2017

Related U.S. Application Data

(60) Provisional application No. 62/387,260, filed on Dec. 23, 2015.

(51) Int. Cl.
*G05B 19/418* (2006.01)

(52) U.S. Cl.
CPC .............. *G05B 19/4183* (2013.01)

(58) Field of Classification Search
None
See application file for complete search history.

(56) References Cited

U.S. PATENT DOCUMENTS

| | | | |
|---|---|---|---|
| 5,341,625 A | 8/1994 | Kramer et al. | |
| 5,376,219 A | 12/1994 | Sperry et al. | |
| 5,764,521 A | 6/1998 | Batchelder et al. | |
| 5,829,231 A | 11/1998 | Harding et al. | |
| 6,910,997 B1 | 6/2005 | Yampolsky et al. | |
| 6,932,751 B1 | 8/2005 | Ward et al. | |
| 7,055,350 B2 | 6/2006 | Bonnain et al. | |
| 8,016,735 B2 | 9/2011 | Wetsch et al. | |
| 8,061,110 B2 | 11/2011 | Wetsch | |
| 8,128,770 B2 | 3/2012 | Wetsch et al. | |
| 8,267,848 B2 | 9/2012 | Wetsch et al. | |
| 8,641,591 B2 | 2/2014 | Wetsch et al. | |
| 8,683,777 B2 | 4/2014 | Armington et al. | |
| 9,168,715 B2 | 10/2015 | Wetsch et al. | |
| 2001/0049920 A1 | 12/2001 | Yamamoto et al. | |
| 2005/0010323 A1 | 1/2005 | Cocciadiferro et al. | |

(Continued)

OTHER PUBLICATIONS

Non Final Office Action, U.S. Appl. No. 14/749,866, dated Nov. 20, 2017, pp. 1-9.

*Primary Examiner* — Yolanda R Cumbess

(74) *Attorney, Agent, or Firm* — Dorsey & Whitney

(57) ABSTRACT

A control device comprising a processor and a memory. The memory contains computer readable instructions that, when executed by the processor, cause the processor to retrieve from a memory a queue containing a plurality of sets of instructions, each set of instructions corresponding to parameters for forming a unit of packaging material, cause a packaging machine to create a plurality of packaging units according to the parameters, receive user input corresponding to a rewind queue functionality, and rewind the queue to cause the packaging machine to rerun a portion of the queue and create some of the plurality of the packaging units during the rerun.

23 Claims, 15 Drawing Sheets

(56) References Cited

U.S. PATENT DOCUMENTS

| | | |
|---|---|---|
| 2005/0108704 A1* | 5/2005 | Marinelli .................. G06F 8/61 717/174 |
| 2007/0162287 A1 | 7/2007 | Dietzsch et al. |
| 2008/0172986 A1 | 7/2008 | Theurer et al. |
| 2010/0089011 A1 | 4/2010 | Armington et al. |
| 2011/0197550 A1 | 8/2011 | Carlson et al. |
| 2012/0165172 A1 | 6/2012 | Wetsch et al. |
| 2013/0047551 A1 | 2/2013 | Jones |
| 2013/0047552 A1 | 2/2013 | Cocciadiferro |
| 2013/0047554 A1 | 2/2013 | Bertram et al. |
| 2013/0204419 A1 | 8/2013 | Pettersson et al. |
| 2014/0038805 A1 | 2/2014 | Wetsch et al. |
| 2014/0260121 A1 | 9/2014 | Tokuda et al. |
| 2014/0261752 A1 | 9/2014 | Wetsch |
| 2015/0239195 A1 | 8/2015 | Wetsch et al. |
| 2015/0239592 A1 | 8/2015 | Wetsch |
| 2016/0001003 A1 | 1/2016 | Perazzo et al. |
| 2017/0300613 A1 | 10/2017 | Sager |

* cited by examiner

REWIND QUEUE FEATURE FOR PROTECTIVE PACKAGING CONTROL

CROSS-REFERENCE TO RELATED PATENT APPLICATION

This application claims the benefit of U.S. provisional Application No. 62/387,260 filed on Dec. 23, 2015, the entire contents of which are expressly incorporated herein by reference thereto.

TECHNICAL FIELD

The present invention relates generally to packaging machines, and more specifically, to a computerized controller for packaging machines.

BACKGROUND

Packaging machines are used to create packaging elements, which may be used to surround or contain objects in a predetermined volume (e.g., box) to allow the object to be shipped, transported, stored, and the like with a reduced risk of damage. Examples of packaging machines include foam-in-bag machines that inflate bags with expandable foam where the foam provides the cushioning support, air-bag machines that inflate bags with air or other similar gas to provide the cushioning support, and dunnage machines that shred materials such as paper where the shredded elements provide cushioning for the objects.

Operational control of packaging machines often requires manual input by a user or machine administrator. For example, for a foam-in-bag machine, such settings can include, bag dimensions, the percentage of foam that should be inserted into the bag, and the number of bags desired. Other types of machines include related types of input requirements. These manual inputs can be some limited, as well as time consuming, confusing or difficult to follow, and may result in issues due to human error (e.g., typographical errors, etc.). Furthermore, users of conventional packaging machines may be required to manually enter inputs to make numerous packaging elements, cumbersomely waiting for each packaging element to be created before entering an input for a subsequent packaging element. This can result in an inefficient use of the user's time, as well as the user's employer's resources.

SUMMARY

In embodiments, disclosed is a method for creating packaging elements, and a device for performing the method. The device includes a processor and memory that contains computer readable instructions that, when executed by the processor, cause the processor to perform the method. The method includes retrieving, from a memory, a queue containing a plurality of sets of instructions, each set of instructions corresponding to parameters for forming a unit of packaging material, causing a packaging machine to create a plurality of packaging units according to the parameters, receiving user input corresponding to a rewind queue functionality, and rewinding the queue to cause the packaging machine to rerun a portion of the queue and create some of the plurality of the packaging units.

Also disclosed is a system that includes the device, and a packaging machine, the packaging machine including a first packaging machine that creates a first plurality of first packaging units, and a second packaging machine that creates a plurality of second packaging units. The first packaging units may be a different type of packaging element than the second packaging unit. In some cases, the first packaging machine is a foam-in-bag machine.

In some embodiments, upon receiving the user input corresponding to the rewind queue functionality, item graphics are presented on a display, and each item graphic corresponds to one or the plurality of sets of instructions, and a user selection for one of the items graphics is received. In some of the embodiments, the item graphics are presented on the display in an order indicative of an order to create the packaging units. In some embodiments, causing the packaging machine to create a plurality of packaging units comprises causing a first packaging machine to create a plurality of first packaging units; and causing a second packaging machine to create a plurality of second packaging first packaging units are a different type of packaging element than the second packaging units, wherein the first packaging units are a different type of packaging element than the second packaging units. The first packaging machine can be a foam-in-bag (FIB) machine, and the plurality of first packaging units can be a plurality of FIB bags, and the parameters include at least one of lengths of the FIB bags or percentage of the FIB bags to be filled with foam.

In embodiments, disclosed is a method for creating packaging units. The method includes receiving a first user input corresponding to first parameters for forming a first unit of packaging material, adding first instructions corresponding to the first unit to a queue for a packaging machine, receiving a second user input corresponding to second parameters for forming a second unit of packaging material, adding second instructions corresponding to the second unit to the queue, causing the packaging machine to create the first and second units of packaging material according to the first and second parameters, receiving user input corresponding to a rewind functionality, causing a user interface to present on a display a first item graphic corresponding to the first set of instructions and a second item graphic corresponding to a second set of instructions, receiving a user selection for the second item graphic, and causing the packaging machine to remake another second packaging unit according to the second parameters, without remaking another first packaging unit.

DETAILED DESCRIPTION

Figure 1:
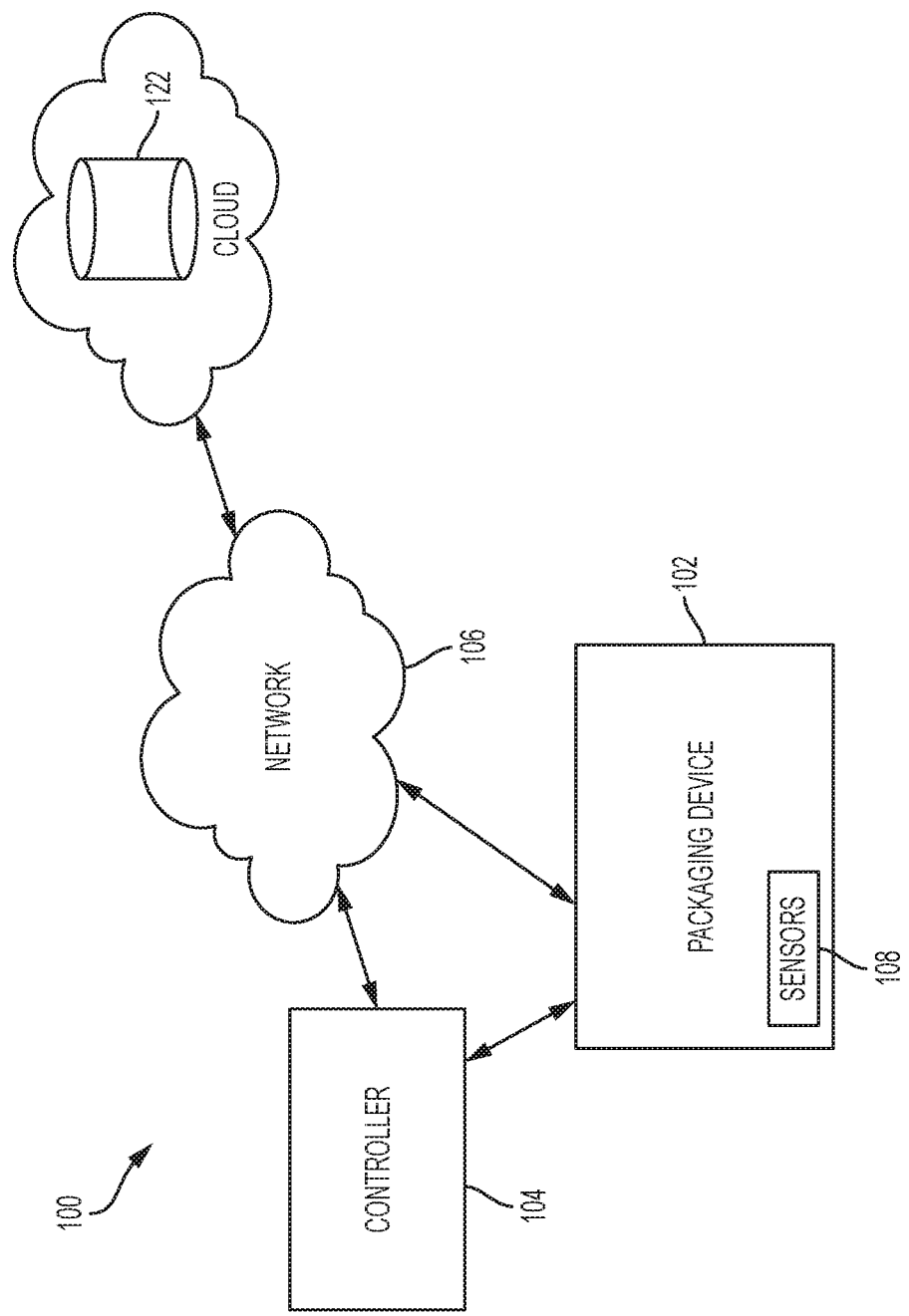
FIG. 1 is a block diagram of a packaging system including a packaging machine and a controller.

In some embodiments herein, a packaging system including a controller and a packaging machine is disclosed. The packaging machine is typically a device for making protective packaging, although in other embodiments it can be other types of manufacturing machines. Embodiments of machines include those that create packaging material, including protective packaging materials and void fill. Exemplary types of packaging elements include dunnage and filled cushions packaging elements.

One type of dunnage is low-density dunnage that weighs very little compared to the volume that it occupies in a package. Low-density dunnage can be made, for example, by forming a flat material, or a material in a high-density configuration such as in a dense roll or stack (e.g., a fanfolded stack of a long sheet or a stack of individual sheets), into a three-dimensional configuration in which the volume it occupies is highly increased. One example is crumpled or folded material that can be made from sheets of material, wherein the material in the crumpled or folded configuration takes up more space than it does in a flat, sheet configuration (i.e., a packaging element that is formed from sheet material is of a lower density than the sheet material). Various types of dunnage include longitudinally crumpled dunnage, cross crumpled dunnage, and rolled dunnage. Dunnage can be made of paper, plastic, and/or other suitable materials. Dunnage can also be provided in the form of soft, preformed foam, for instance, such as taken from a supply roll.

Types of filled cushion packaging elements typically include an outer container, such as a film membrane of plastic or other suitable material, which is filled with a substance that provides the void fill and/or cushioning or other protective packaging function. The filled membrane is typically flexible. Filled cushions can be filled with a solidified material, such as foam made from mixing foam precursors, which can take a shape and solidify in a bad around the contours of the item to be packaged, such as in foam-in-bag packaging elements. Other filled cushions are filled with a fluid, such a gas (e.g., air for air-filled cushions) or a liquid.

The controller is any suitable type of processor, computer, or electronic module associated with or in the machine. In some embodiments, the controller can be a computer. The computer may be a portable computer, such as a tablet, smart phone, gaming device, or the like, and is placed into communication with the packaging machine as well as one or more sensors that may be connected to or integrated with the packaging machine. As will be described in more detail below, the controller may control and/or vary one or more components of the packaging machine (e.g., settings, machine selections, cushioning characteristics, etc.) and may sense and control input materials provided to the packaging machine (e.g., sheets of plastic used to create the inflatable bags). Further, the controller may also be in communication with one or more other controllers and/or machines, so as to allow the controller to communicate with and control an entire warehouse or other grouping of packaging machines, where the group of machines may be located in a single location or in two or more locations.

In some embodiments, the controller receives an input indicating a desired packaging element to be created and/or a packaged object for which the packaging element is needed. Based on the input, the controller may adjust the machine parameters to create the desired packaging element. The input may be a user input (e.g., selection of an icon or entered data), may be sensed by the controller or machine (e.g., first type of material corresponds to a first type of bag), or may be a combination of a sensed and user input. Depending on the packaging machine and user preferences, the controller may be configured to selectively modify, control, monitor, and/or activate each component of the packaging machine and may do these actions either based on a user input, automatically (e.g., through sensed data), or a combination thereof.

As briefly discussed above, the controller may include a display either integrated therewith (e.g., a tablet) or a display that is separate from the controller but in communication therewith. The display may be used to display a graphical user interface (GUI) that allows a user to select and modify parameters of the machine and/or to instruct the machine to create a desired packaging element or elements in a desired order and with a particular set of characteristics. The GUI may include icons or indicia that mirror or mimic characteristics of particular packaging elements (e.g., image that matches an image of a particular bag). This allows a user to quickly visually identify the desired input without requiring additional knowledge of the machine. The icons may indicate selected characteristics and parameters of packaging element or elements and the icons may reflect changes to the parameters. A user can select one or more icons to provide instructions to the machine based on the desire packaging element or elements to be created by the machine.

The controller may receive user input that loads the selected packaging element to be created into a manufacturing queue for the packaging machine. Alternatively or additionally, the icons or other input components for the controller may be configured to set a sequence of bags or other packaging elements that can then be added as a group to the queue of the machine. For example, when the user selects a particular icon on the GUI, a first sequence of packaging elements may be programmed into the machine in order to be manufactured in the order of the sequence. The packaging elements within the sequence may then be added to the machine's queue to create those elements. The packaging elements within the queue may thus be added either via a particular sequence or may be added individually. This allows the queue of the machine to be dynamically tailored to the specific needs of the user. Also, the order of items within the queue may be selected and/or modified. For example, when adding a new item or sequence to the queue the user or the controller may assign the item or sequence a priority, where the priority may determine the item or sequence's placement within the queue. This allows certain packaging elements to be made before others, depending on the priority. As another example, while or after a queue is created, a user may modify the order of items within the queue. The order of the items within the queue and changes made thereto may be represented by the GUI. For example, the icons indicated items or sequences may be presented on the GUI according to the order of the items or sequences within the queue.

In some embodiments, the controller may control production steps relating to how the machine produces packaging elements. For example, the controller may insert pauses into the queue of the packaging machine, e.g., between each packaging element and/or sequence, the controller may instruct the machine to enter into a pause state or otherwise not proceed to the next element in the sequence until a set period of time has elapsed. These pauses can help to ensure that the machine does not overheat, that the packaging elements are made correctly, or that the downstream processes (e.g., removing of the packaging elements from the machine) can be done before the next packaging element is created. As another example, the controller may be configured to insert a cleaning step into the queue of the packaging machine. For example, the cleaning step may cause the packaging machine to administer a cleaning fluid to one or more components of the machine. For example, for a foam-in-bag machine, a solvent may be administered to prevent buildup of the foam precursor, increasing the longevity of the machine run time and efficiency of the machine.

In one example, the controller may receive data (e.g., input by a user, from a sensor such as a bar code scanner, or the like) regarding an object to be packaged using the packaging elements created by the machine or machines. In this example, the controller may preload a desired item or queue of items to be created based on the packaged item into the machine, as well as may display steps or operations that may be performed by other machines or by the user. In this example, the controller provides instructions (to the machine and/or user) regarding the entirety of, or a portion of, the packaging flow for the item. This allows customized packaging to be more easily created and integrated into an automated process.

Various features provided by the controller may be set to various access levels. For example, an administrator may be able to access and modify features that a user may not be able to access. This allows a manufacturer to prevent some settings on the packaging machine from being modified by a user, while still allowing those features to be modified by a person having the correct access levels. For example, a manufacturer may preset certain queues and the user may not be able to change the parameters of the queues. As another example, an administrator may set certain maximums for queues or minimum time between items to ensure that the machine is operated under efficient conditions.

The controller may be used to track the location of the machine itself and/or one or more components. For example, some users may move or transport the packaging machines across a warehouse, to other locations, based on available storage or the like. Due to this movement of the exact location of a particular machine may not be known to certain users. In some instances the controller may include a locating beacon that can be used locate one or more machines that the controller is attached to or in communication with. This allows a user to know the location and optionally status of any machine within a machine group, which can assist in faster identification of a problematic machine, allow a machine owner or manufacturer to keep updated records of machine locations, and to help deter theft of the machines. As one example, the beacon may be a global positioning satellite (GPS) tracking system or other location identifying system that determines a relative location of the detected component.

Figure 2A:
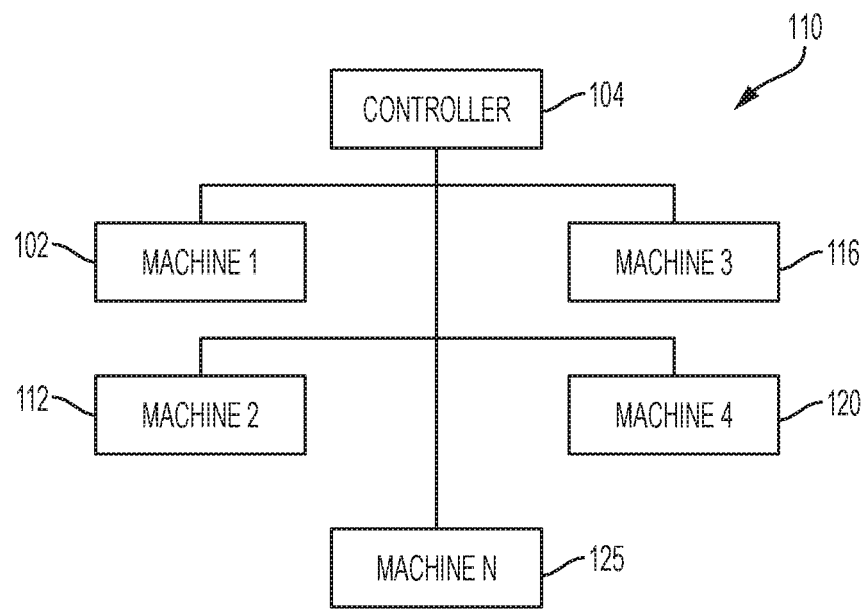
FIG. 2A is a block diagram of the packaging system of FIG. 1 including additional machines.
Figure 2B:
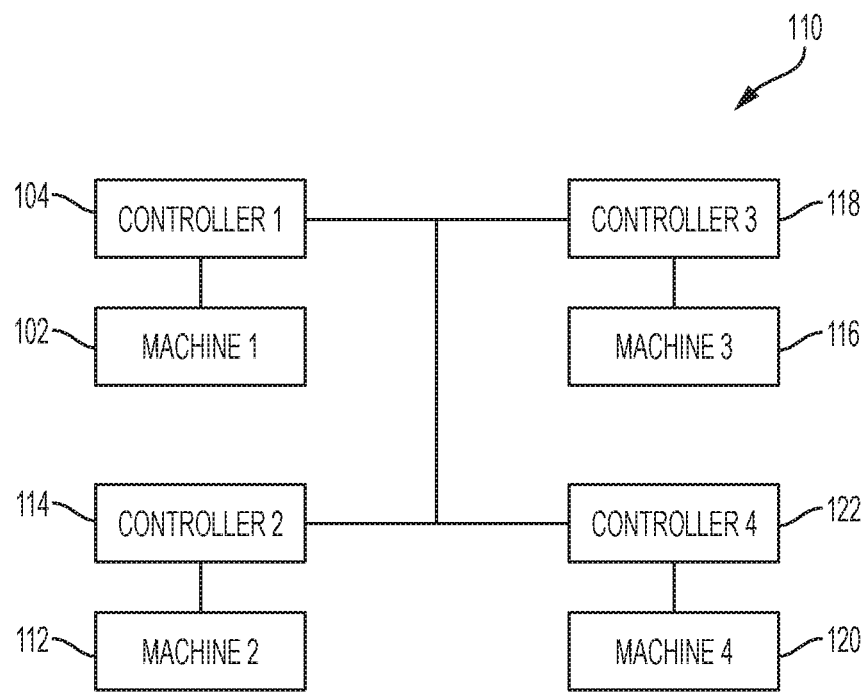
FIG. 2B is a block diagram of the packaging system of FIG. 1 including additional controllers and machines.

Turning now to the figures, a system for controlling one or more manufacturing machines will now be discussed. It should be noted that although the below examples are discussed with respect to packaging material manufacturing machines, the present disclosure may be applied to substantially any suitable type of manufacturing machine. FIG. 1 is a block diagram illustrating a manufacturing and control system with a single machine and controller. FIG. 2A is a block diagram illustrating a system with multiple machines. FIG. 2B is a block diagram illustrating a system with multiple machines with their own controllers. With reference to FIG. 1, the manufacturing and control system 100 may include a machine 102 having one or more sensors 108 and a controller 104. The controller 104, and optionally the machine 102, may be in communication with a network 106 which allows the controller 104 and/or machine 102 to receive and transmit data to and from other controllers, machines, and/or computing devices, as will be discussed in more detail below. The controller 104 and/or machine 102 may communicate with an external database, such as a cloud database 122 that runs on a cloud computing platform.

The controller 104 is in electrical communication with the machine 102 and the network 106 and optionally the cloud database 122. With reference to FIG. 2A, in a multiple machine system 110, the controller 104 may be in communication with other machines 112, 116, 120, 125. This allows the controller 104 to receive and send data to each of the machines 102, 112, 116, 120, 125 and allows a single controller to control the operations and operating settings of the machines. As one example, the controller 104 may send and receive instructions to each of the machines, allowing a single controller 104 to operate multiple machines. In these embodiments, the machines may not include a display or other user interface or may have a simplified user interface and the operation and programming of the machine may be done via the controller 104 (e.g., through communication through the network 106).

With reference to FIG. 2B, in a multiple machine system 110, each controller 104, 114, 118, 122 may be in communication with at least one another controller, or as shown in FIG. 2B every controller (either directly or indirectly) within the system 110. This allows each of the controllers 104, 114, 118, 122 to send and receive data between each other and receive and send data about each machine 102, 112, 116, 120 within the system 110.

Figure 2C:
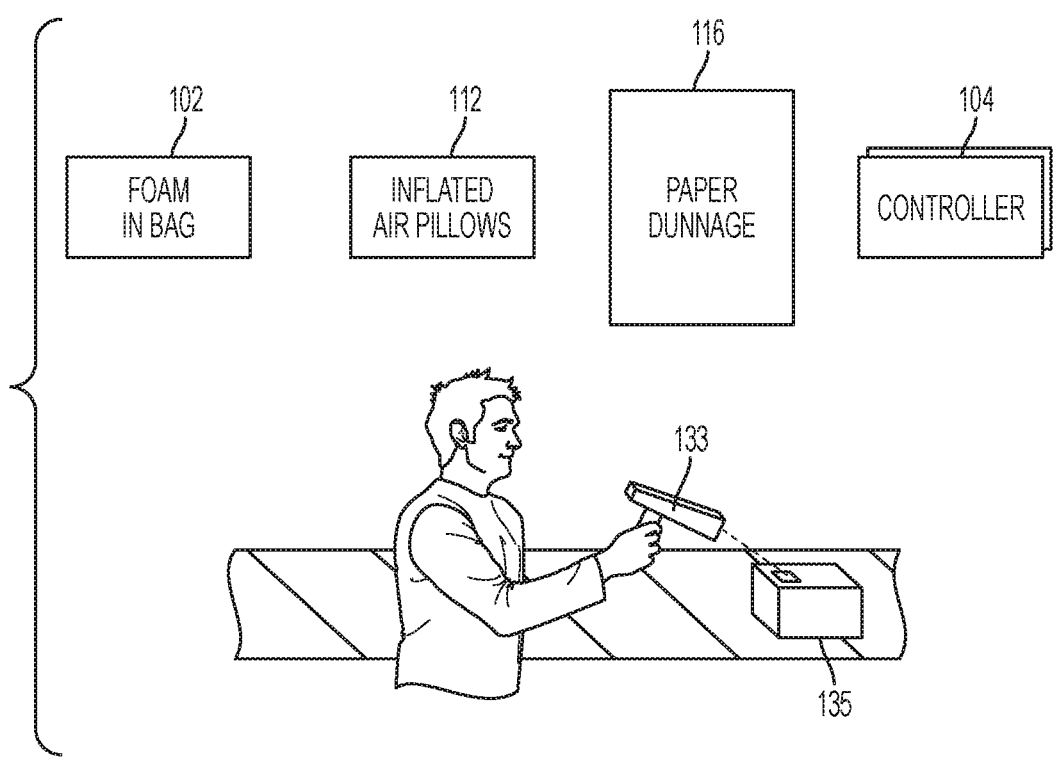
FIG. 2C is a diagram illustrating the system of FIG. 2A with various types of machines.

In the system 110 shown in FIGS. 2A and 2B, each machine 102, 112, 116, 120 may be in a similar physical location (e.g., in a single warehouse, campus, or station) or may be in a variety of different locations spatially separated from one another (e.g., across multiple states, countries, or the like). The system 110 may allow each controller 104, 114, 118, 122 to control one or more of the machines 102, 112, 116, 120. The multiple machine system 110 of FIGS. 2A and 2B may include the same components as the system 100 of FIG. 1 and as such, for ease of explanation, the following discussion is made with respect to the single machine system 100 of FIG. 1, but may be understood to apply to the components of the system 110. That is, each of the controllers 114, 118, 122 and machines 112, 116, 120 of system 110 that are not discussed below may be substantially the same as controller 104 and machine 102, respectively, of the system 100 discussed below, with the exception being that any of the machines and/or controllers may be different from one another within the system 110. As shown in FIG. 2C, the machines may be grouped in packaging "stations" where a controller 104 may control different types of machines that a user can operate simultaneously or separately.

With reference to FIG. 2C, in this embodiment, the system 110 may include three different types of machines, such that the first machine 102 may be a foam-in-bag machine, the second machine 112 may be an inflated air pillow machine, and the third machine 116 may be a paper dunnage machine. In this example the controller 104 may control the queues and/or sequences (discussed in more detail below) for each of the machines 102, 112, 116 although the machines may each make different packaging elements. Additionally, in this example the system 110 may include an external sensor 133, such as a barcode scanner, that may be used to receive data and transmit data to the controller 104. In the embodiment shown in FIG. 2C, each of the machines, the controller 104, and/or the external sensor 133 may be in communication with the controller 104 and/or each other, e.g., through a WiFi network, Bluetooth, or the like.

In some embodiments, using the system 110 shown in FIG. 2C, the user may scan a packaging object 135 (i.e., an object to be packed and cushioned using cushioning materials) using the external sensor 133. The external sensor 133 may scan a barcode, serial number, color, quick response (QR) code, or the like, and transmit the object data to the controller 104. In some embodiments, as described in U.S. application Ser. No. 15/389,987 titled "Object Recognition for Protective Packaging Control" filed on Dec. 23, 2015, the contents of which is hereby incorporated by reference in their entirety, the external sensor 133 scans the object and sends the controller 104 data indicative of physical characteristics for the object. Based on the physical characteristics, the controller 104 determines a type of object to which the object corresponds; and based on the type, the controller 104 selects one or more type of packaging elements for packaging the object, and causes a packaging machine to create packaging elements of the selected type. Based on the data, the controller 104 determines the type of packaging elements needed for the object 135 and transmits the items into the queues for each of the machines 102, 112, 116, which either substantially simultaneously or sequentially, creates the packaging elements.

As the machines are creating the packaging elements or afterwards, the controller 104 may then display one or more tutorials or videos that instruct the user how to assemble the object 135 in the package with the corresponding packaging elements (e.g., foam-in-bag packaging elements go on bottom, dunnage elements on top after object placed into box on foam-in-bag, etc.). Further, the controller 104 may provide instructions to a user regarding steps for shipping or other handling of the object 135 that may not be completed by the machines 102, 112, 116, such as, but not limited to, print shipping label, transfer to a specific station or person, and so on. Thus, the system 110 of FIG. 2C may be able to function as a packaging station that allows a user to control multiple machines and can be specialized and/or modified dynamically for items.

Figure 3:
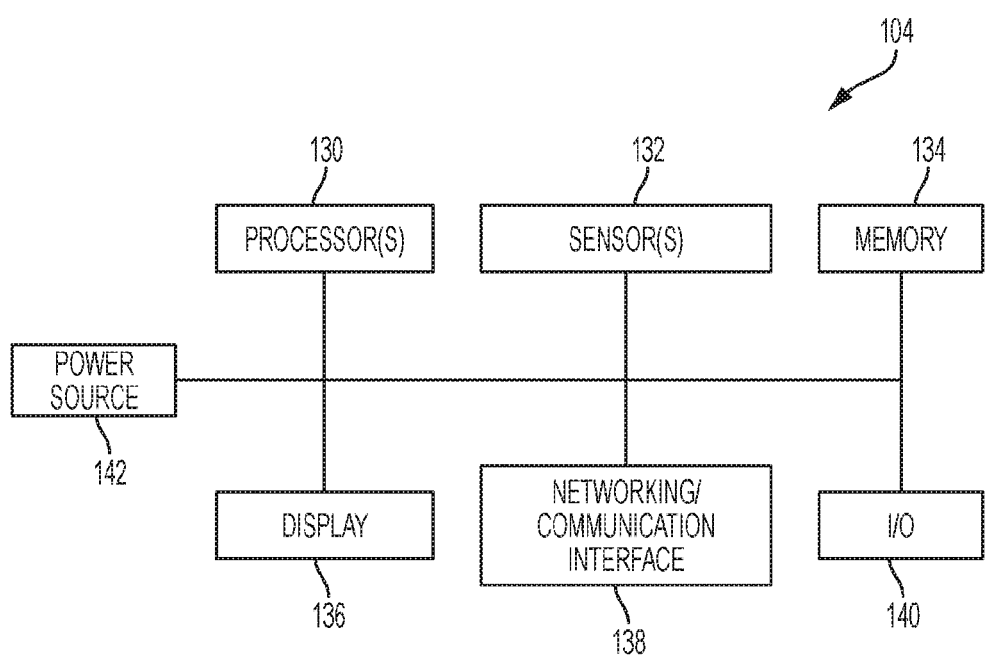
FIG. 3 is a simplified block diagram of the controller of FIG. 1.

With reference again to FIG. 1, the controller 104 and the machine 102 will now be discussed in more detail. FIG. 3 is a simplified block diagram of the controller. FIG. 4F is an enlarged view of the controller connected to the machine. With reference to FIGS. 1 and 3, the controller 104 may be substantially any type of electronic or computing device. Some non-limiting examples include a tablet computer, a smartphone, a digital music player, portable gaming station, laptop computer, microcomputer, processor or processing chip, or the like. In many embodiments the controller 104 may be a portable computing device with an integrated touch sensitive display, such as a tablet computer or smart phone.

The controller 104 may include one or more processing elements 130, one or more sensors 132, one or more memory components 134, a display 132, a networking/communication interface 138, and an input/output interface 140. Each of the components may be in communication either directly or indirectly with one another via one or more systems busses and each will be discussed in turn below. It should be noted that FIG. 3 is meant as exemplary, and in other examples, the controller 104 may include fewer or more components than those shown in FIG. 3.

Figure 4A:
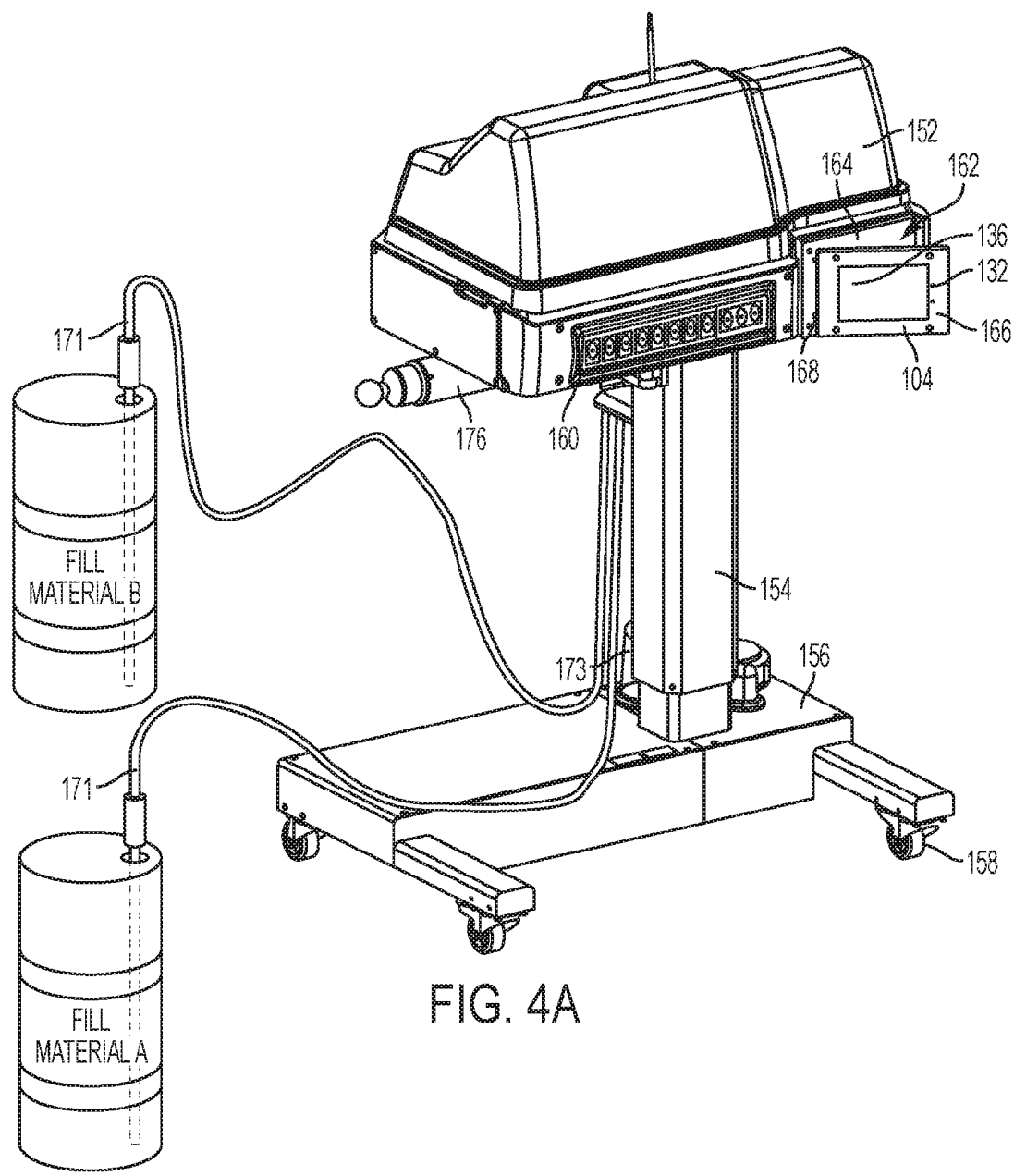
FIG. 4A is a rear isometric view of an example of a packaging assembly including foam precursor or other chemical supplies.
Figure 4B:
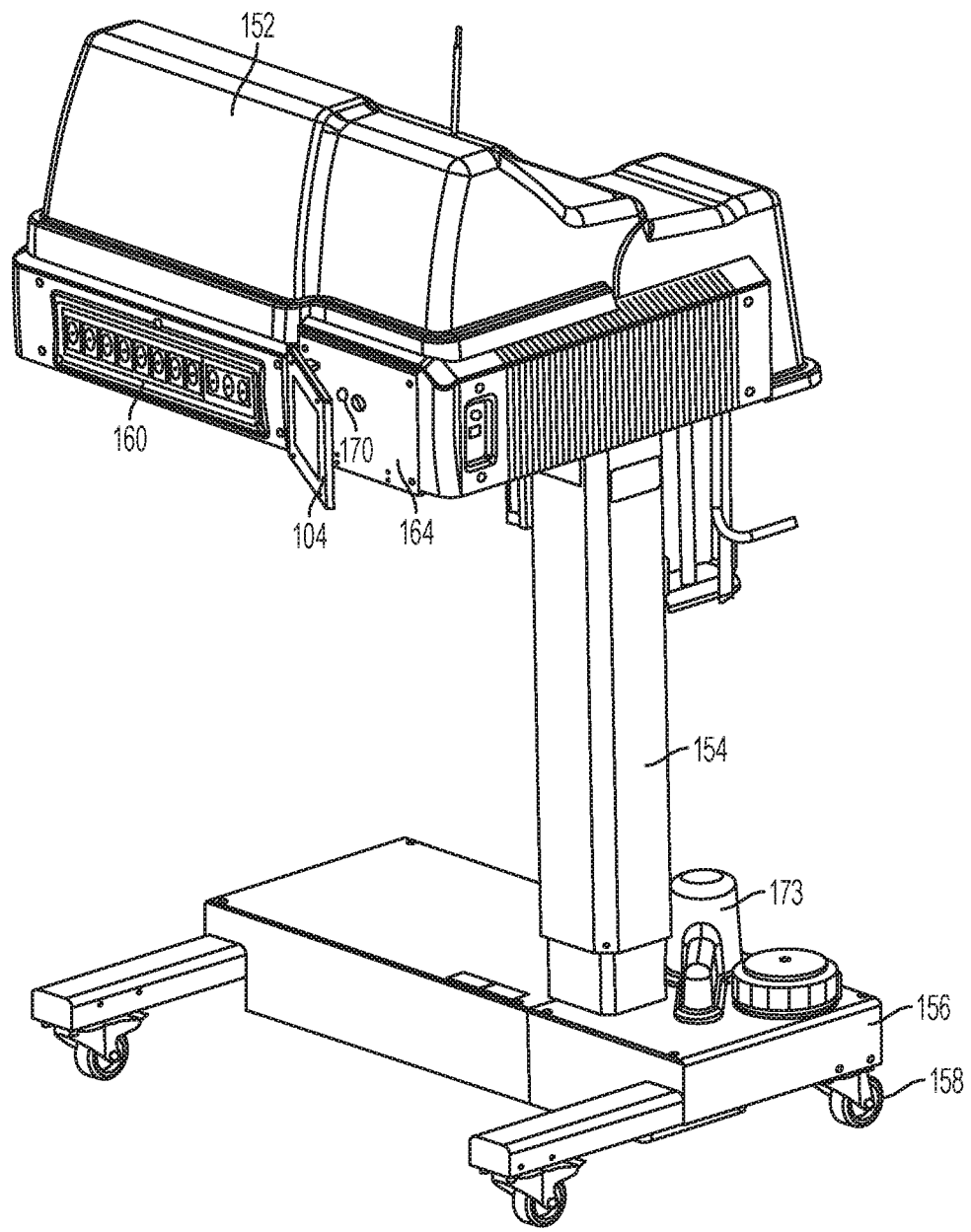
FIG. 4B is a side isometric view of the packaging assembly of FIG. 4A with the material supplies hidden for clarity.
Figure 4C:
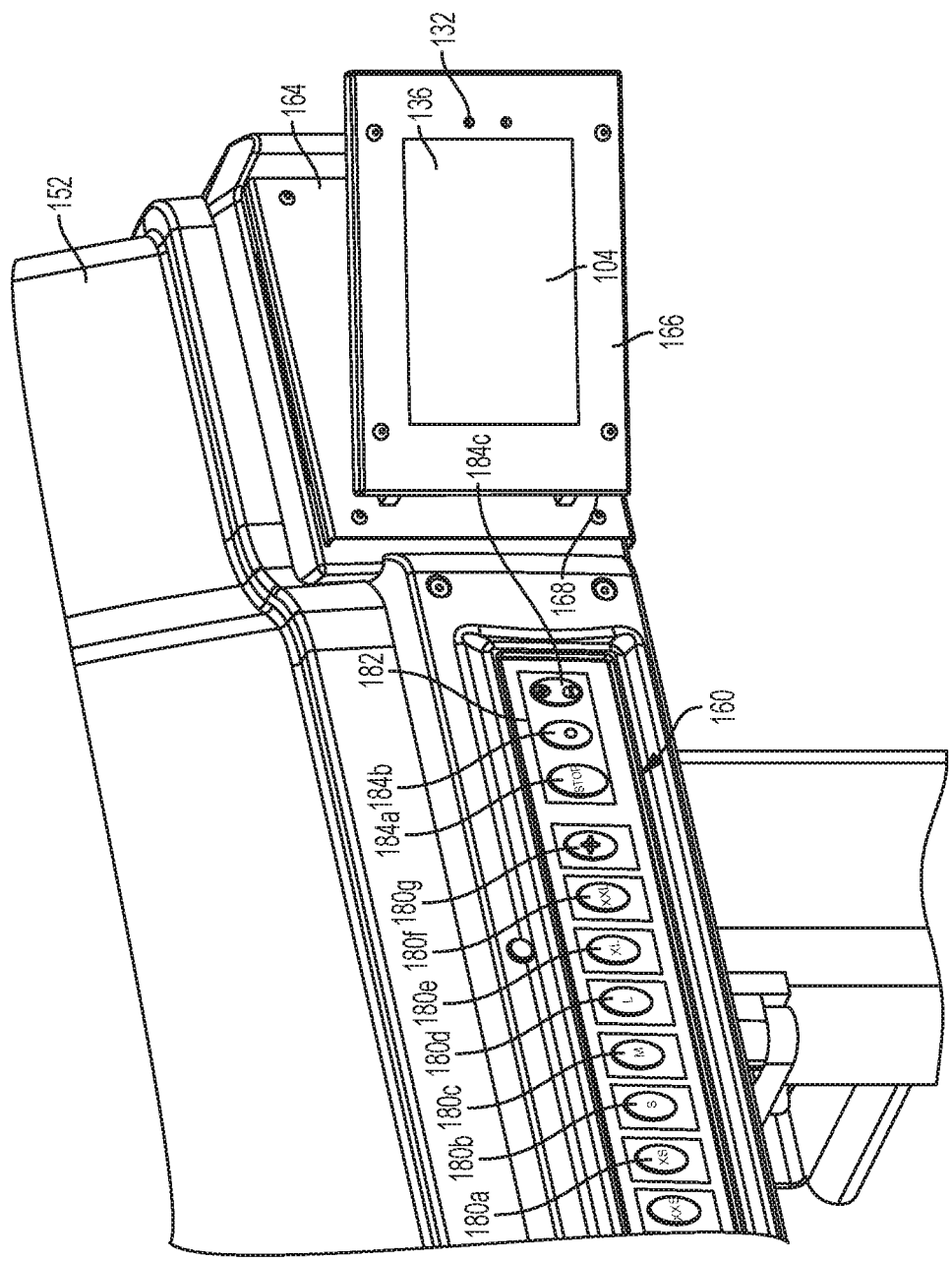
FIG. 4C is an enlarged view of FIG. 4A.

With reference to FIGS. 4A-4C, in embodiments where the controller is a portable computing device with an integrated touch sensitive screen (e.g., a tablet or smart phone), the controller may include a device enclosure 113 that encloses at least a portion of the select components. For example, the enclosure 113 may define a housing for the components of the controller 104, while still providing access to the components, such as one or more cameras 117, ports 115, and/or input/output buttons 119. Additionally, the enclosure 113 may only enclose a portion of the display 136 to allow the display to be visible and accessible to the user.

With reference again to FIG. 3, the one or more processing elements 130 may be substantially any suitable electronic device cable of processing, receiving, and/or transmitting instructions. For example, the processing element 130 may be a microprocessor or a microcomputer. Additionally, it should be noted that the processing element 130 may include more than one processing member. For example, a first processing element may control a first set of components of the controller 104 and a second processing element may control a second set of components of the controller 104, where the first and second processing elements may or may not be in communication with each other. Additionally, each processing element 130 may be configured to execute one or more instructions in parallel.

The sensors 132 may provide substantially any type of input to the controller 104. For example, the sensors 132 may be one or more accelerometers, microphones, global positioning sensors, gyroscopes, light sensors, image sensors (such as a camera), force sensors, and so on. The type, number, and location of the sensors 132 may be varied as desired and may depend on the desired functions of the system 100. In some examples, the sensors 132 may include at least a camera 117 and a microphone 127 that capture images and sound, respectively.

The memory 134 stores electronic data that may be utilized by the controller 104. For example, the memory 134 may store electrical data or content e.g., audio files, video files, document files, and so on, corresponding to various applications. The memory 134 may be, for example, non-volatile storage, a magnetic storage medium, optical storage medium, magneto-optical storage medium, read only memory, random access memory, erasable programmable memory, flash memory, or a combination of one or more types of memory components.

The display 136 provides a visual output for the controller 104. The display 136 may be substantially any size and may be positioned substantially anywhere on the controller 104. In some embodiments, the display 136 may be a liquid display screen, plasma screen, light emitting diode screen, and so on. The display 136 may also function as an input device in addition to displaying output from the controller 104. For example, the display 136 may include capacitive touch sensors, infrared touch sensors, or the like that may capture a user's input to the display 136. In these embodiments, a user may press on the display 136 in order to provide input to the controller 104. In other embodiments, the display 136 may be separate from or otherwise external to the electronic device, but may be in communication therewith to provide a visual output for the electronic device.

The networking/communication interface 138 receives and transmits data to and from the controller 104. The networking/communication interface 138 may be transmit and send data to the network 106, other machines, and/or other computing devices. For example, the networking/communication interface may transmit data to and from other computing devices through the network 106 which may be a wireless network (WiFi, Bluetooth, cellular network, etc.) or a wired network (Ethernet), or a combination thereof.

As a specific example, the networking/communication interface 138 may be configured to allow the controller 104 to communicate with the machine 152 and control various components within the machine. The networking/communication interface 138 may translate messages from the controller 104 into a form that the machine 104 can understand and receive. For example, with reference to FIG. 4F, the networking/communication interface 138 may include an input port 115 that is defined through the device enclosure 113. In this example, the input port 115 may be a micro universal serial bus port, but many other types of ports are envisioned. The input port 115 may receive a connector, such as the male end of a cable and when connected transmits data to and from the machine 102 from the controller 104.

The input/output interface 140 allows the controller 104 to receive inputs from a user and provide output to the user. For example, the input/output interface 140 may include a capacitive touch screen, keyboard, mouse, stylus, or the like. The type of devices that interact via the input/output interface 140 may be varied as desired. In one example, one or more buttons 119 may be included in the input/output interface 140. The buttons 119 allow a user to provide input to the controller 104 such as returning to a home screen, selecting a particular function, or the like.

The controller 104 may also include a power supply 142. The power supply 142 provides power to various components of the controller 104. The power supply 142 may include one or more rechargeable, disposable, or hardwire sources, e.g., batteries, power cord, or the like. Additionally, the power supply 142 may include one or more types of connectors or components that provide different types of power to the controller 104. In some embodiments, the power supply 142 may include a connector (such as a universal serial bus) that provides power to the controller 104 or batteries within the controller 104 and also transmits data to and from the controller 104 to the machine 102 and/or another computing device.

With reference again to FIG. 1, the machine 102 may be substantially any type of manufacturing machine. However, in many embodiments the machine 102 may be a packaging machine that produces packaging materials or packaging elements, such as, but not limited to, dunnage, foam-in-bag pillows, air or gas filled pillows, bubble wrap, or the like. Examples of sheet-fed paper dunnage machines that may be used with the system 100 of FIG. 1 include machines such as those described in U.S. Pat. No. 8,267,848 entitled "Dunnage Device and Handler Disengagement," which is incorporated by reference herein in its entirety. Examples of center-fed paper dunnage machines include those described in U.S. Pat. No. 8,641,591 entitled "Center-Fed Dunnage System," and U.S. Publication No. 2012/0165172 entitled, "Center Fed Dunnage System and Cutter." Examples of air inflation sealing device machines include U.S. Pat. No. 8,061,110 entitled "Inflation and Sealing Device with Disengagement Mechanism," U.S. Pat. No. 8,128,770 entitled, "Inflation and Sealing Device for Inflatable Air Cushions," U.S. Pat. No.9,168,715 entitled, "Packaging pillow device with upstream components," and U.S. Publication No. 2014/0261752 entitled "Replaceable Blade," each of which is incorporated by reference herein in its entirety. Examples of foam based protective packaging machines include U.S. Publication No. 2013/0047554 entitled, "Spindle Mechanism for Protective Packaging Device," U.S. Publication No. 2015/0239592 and U.S. Publication No. 2015/0239195 entitled, "Inflation and Sealing Device and Methods," and U.S. Publication No. 2015/0239195 entitled, "Recipe Controlled Device for Making Packaging Materials," each of which is incorporated by reference herein in its entirety.

FIGS. 4A-4C illustrate various views of an example of a foam-in-bag (FIB) machine incorporating the controller 104. With reference to FIGS. 4A-4C, the FIB machine 152 includes a control panel 160 and a mounting assembly 162 for the controller 104. Additionally, the machine 152 may be supported on a stand 154 anchored to a base 156 having a set of wheels 158. The stand 154 may allow the machine 152 to be telescoping to allow the machine 152 to be positioned at various heights relative to the base 156.

The FIB machine 152 may be substantially similar to the machine described in U.S. Publication No. 2013/0047552 entitled "Foam-in-Bag Apparatus with Power Failure Protection," and incorporated by reference herein in its entirety.

The FIB machine 152 may include one or more pumps 171 fluidly connected to one or more foam precursor supply chemicals, Fill Material A and Fill Material B, such as chemical canisters that are used to create a cushioning foam. One or more nozzles or hoses may be used to connect the pumps 171 to the respective fill material supply containers and connect the pumps 171 to the machine 152, allowing the supply containers to be positioned in locations separate from the FIB machine 152. The machine 152 may also include a solution pump 173 connected to its base 156. The solution pump 173 may be fluidly connected to a cleaning solution reservoir that may be attached to or separate from the machine. The machine 152 may also include a roll reception assembly 176 that extends outward from the machine 152. The roll reception assembly 172 may include a dowel or other roll support that receives a roll of film material, such as the material used to form the bag in which the foam is injected into.

For a FIB machine, in operation, one or more foam precursors are fluidly connected to the pump 174, and a film roll is loaded on the roll reception assembly 176. For example, the film may be fed through the machine 152 and the machine 152 seals the edges of two sheets of film together and the foam precursor is sprayed or deposited between the sheets of film. When a desired fill supply has been inserted into the chamber defined by the sheets, and the film is a desired length, the machine 152 seals the ends of the sheets to seal foam precursor within the chamber. The film is then cut to a desired length by a cutting element and the packaging element is created. Other known types of foam-in-bag machines can also or alternatively be used.

For a machine that makes paper or other crumpled or folded dunnage machine, the machine can use suitable stock materials, such as individual, separate, e.g. pre-cut, sheets, tubes, or a continuous sheet or other material that is cut to length, typically after or during its being formed into dunnage. Continuous type stock material examples include a long strip of sheet material fed from the interior or exterior of one or more supply rolls or fanfolded material stacks. The converter can be configured to crumple the sheets in a desired direction, such as cross-crumpling with folds and creases extending transversely to the feed direction of the sheets, or longitudinal crumpling, with folds and crease extending longitudinally along the direction in which the sheet(s) are fed through the converter, although a combination of directions or other directions can be used.

In an example of a cross-crumpling device, the dunnage converter may include entry-side crumpling rollers or other elements that move a portion of the sheet with which they interact at a faster rate, and exit-side crumpling rollers or other elements that move a portion of the sheet that they interact with at a slower rate. These rollers can be arranged to define a crumpling zone therebetween. A sheet of material is moved through the entry rollers along a longitudinal path at the faster rate. Since the exit-side rollers move at the slower rate, the material is compressed into the crumpling zone and thus crumpled into dunnage. In some embodiments, entry-side and exit-side crumpling rollers may be displaced transversely along the path with respect to each other to cause shearing effect in the material within the crumpling zone, to form tighter and more offset creases in the transverse region that is disposed longitudinally downstream from the crumple zone. Such devices are disclosed, for instance in U.S. Pat. No. 8,267,848, entitled, "Dunnage Device and Handler Disengagement," the entirety of which is incorporated herein by reference. The control panel 160 and/or the controller 104 may include means for adjusting the speed and/or position of the crumpling rollers to adjust the crumpling of the material. The control panel 160 and/or the controller 104 may include means for controlling a cutting element to cut a predetermined length of the material so to create dunnage of a desired size.

In a longitudinal crumpling machine, typically, long, continuous strips of paper of other material are fed into a converting station. In devices that feed from the inside of a roll, the material may twist along a longitudinal axis as a helix, forming a tube or coil. A drum can be driven to draw the tube or coil through the converting station. A roller can be positioned and biased against the drum to flatten the tube or coil. The biased drum can grip the tube or coil, pull it along the feed path so to pinch the material of the tube or coil so that the material bunches ahead of the pinched portion, and is crumpled so to form dunnage. Such devices are disclosed, for instance in U.S. Application Publication Nos. 2012/0165172 entitled, "Center-Fed Dunnage System Feed and Cutter" and 2014/0038805 entitled, "Dunnage Supply Daisy Chain Connector," the entireties of which are incorporated herein by reference. The control panel 160 and/or the controller 104 may include means for adjusting the speed and/or position of the roller relative to adjust the crumpling of the material. Adjusting the speed and/or position of the roller relative to the drum may also create creases of a desired tightness. The control panel 160 and/or the controller 104 may include means for controlling a cutting feature to cut a predetermined length of the material so to create dunnage of a desired size.

In devices that feed from the outside of a roll, the device may crumple the material in a generally longitudinal pattern, thereby putting a series of longitudinal folds and/or pleats within the sheeting. The device may include a rake having tines and spaces therebetween, over which paper is fed to create waves within the sheeting. The sheeting may then pass through a space between a drum and a guide roller, so that the waves form folds and/or pleats within the paper sheeting. Such devices are disclosed, for instance, in U.S. Pat. No. 8,016,735 entitled, "Apparatus for Crumpling Paper Substrates," the entirety of which is incorporated herein by reference. The control panel 160 and/or the controller 104 may include means for adjusting the positions of the tines and spaces to adjust the size of the waves and thus adjust the configuration of the folds and/or pleats. The control panel 160 and/or the controller 104 may include means for adjusting the speed and/or positions of the drum and guide roller to adjust the folding and/or pleating of the material. The control panel 160 and/or the controller 104 may include means for controlling a cutting feature to cut a predetermined length of the material so to create dunnage of a desired size.

In other devices that feed from the outside of a roll, the device may include a throat section and a pair of crumpling rollers. As material is pulled through the throat section, it may gather or pleat. The gathered or pleated material may be fed between the pair of crumpling rollers, which may press the gathered or pleated material together to form dunnage. Such devices are disclosed, for instance, in U.S. Pat. No. 6,910,997 entitled, "Machine and Method for Making Paper Dunnage," the entirety of which is incorporated herein by reference. The control panel 160 and/or the controller 104 may include means for adjusting the size oft e throat, and/or the speed and/or position of the crumpling rollers to adjust the crumpling of the material. The control panel 160 and/or the controller 104 may include means for controlling a cutting element to cut a predetermined length of the material so to create dunnage of a desired size.

With reference now to FIG. 4C, the control panel 160 will now be discussed in more detail. The control panel 160 includes a plurality of input buttons 180a-180g, 184a-184c that may be used to control aspects of the machines 152. The functions of the input buttons 180a-180g, 184a-184c may be the same as some of the functions that are adjustable via the controller 104 or may be different from those adjustable by the controller 104. In embodiments where the input buttons 180a-180g, 184a-184c of the control panel 160 control functions that are adjustable by the controller 104, the machine 152 may include duplicative controls which may assist in teaching new users how to use the functionality of the controller 104 and may provide a backup control system for the machine 152.

With reference to FIG. 4C, the first set of input buttons 180a, 180b, 180c, 180d, 180e, 180f 180g can be programmed to correspond to the dimensions of the bag produced by the FIB machine 152. For example the first button 180a may correspond to the smallest default size bag, the seventh button 180f may correspond to the largest default size bag, and the eighth button 180g may correspond to the previous size bag that was used. It should be noted that the input buttons may be programmed for substantially any task or input to the machine, such as, but not limited to, item creation sequences, queues, queue rewind (explained in detail below), and different sizes or characteristics that may not necessarily correspond to the external markings on the input buttons.

With reference to FIG. 4C, in addition to the bag dimension input buttons 180a-180g, the control panel 160 may include a secondary control panel 182. The secondary control panel 182 includes a stop button 184a, a film roll button 184b, and a height button 184. The stop button 184a stops the operation of the FIB machine 152, the film machine 184b loads additional film into the machine 152, and the height button 184c adjusts the height of the stand 154 to raise and lower the machine 152.

In some embodiments, the control panel 160 may form part of a machine control system for controlling various components of the machine 152 to form packaging elements. For example, buttons 180a-180g, which corresponding to the dimensions of the bag, may cause the machine control system to control one or more drive mechanisms that output certain amounts of web material to form bags of a particular size. In doing so, when a user activates (e.g., pushes on) a button 180a-180g, data is sent to the drive mechanisms, to thereby activate and control the drive mechanisms.

The controller 104 may send data to the machine 102 to activate and control the drive mechanisms, similarly to the control panel 160. In some embodiments, the controller 104 communicates with the control panel 160. For example, the controller 104 may send data to the control panel 160, and based on the data, the control panel 160 may send data to the drive mechanisms for activating and controlling the drive mechanisms. In some embodiments, the controller 104 may communicate directly to the components of the machine themselves. For example, the controller 104 may send data directly to the drive mechanisms to activate and control the drive mechanisms. In some embodiments, the control panel 106 may be omitted and/or varied as the controller 104 may include functionality of the control panel 106. Additionally, it should be noted that the buttons and their functions as shown in FIGS. 4A-4C may be varied in suitable manners.

As discussed in more detail below, the controller 104 can control the operation, characteristics, and parameters of these machines. For example, the controller 104 may be used to operate the machine 102, track data regarding the machine, the packaging elements, user inputs, and the like, and may also be used to communicate between machines, users, and the network 106. In one example, the controller 104 may track data corresponding to the usage of the machine (e.g., number of packaging elements created, the amount of fill materials, time of peak usage, and so on), the location of the machine (e.g., through global positioning system or beacon) and may then provide this data to another computing device through the network 106 and/or through a direct connection means (e.g., cable, removable memory, etc.). This allows a manufacture to track the operation of its machines and ensure that the machines are operating as desired. Additionally, the data tracking and transmission may allow a manufacture to better service its machines and clients as it can better track customer needs, trends, common issues, and so on.

As the controller 104 can operate the machine, it is able to modify settings of certain components within the machine, and can tailor the components and operation of the machine to particular customers, types of packaging elements, operating environment, and other factors.

As one example, the controller 104 may selectively provide power to certain components within the machine 152. For example, during a maintenance setting, the controller 104 may restrict power to the film-cutting device (such as a heating element) but may provide power to the feed roller. The components may be selectable by a user or may be predetermined based on a setting or the like.

The controller 104 may allow a user to manually vary certain machine parameters. For example the controller 104 may allow a user to adjust the film feed rate, the heating time or temperature, the fill material (e.g., foam-precursor or air) percentage or the like. However, in some embodiments the features that may be modified by a user may be restricted to various levels of user access. For example, a typical user may not be able to modify certain components below or above threshold levels. As another example, certain components may be restricted to typical users. The number of access levels and components that are restricted may be varied as desired.

The controller 104 can set the characteristics for packaging elements (e.g., pillows, paper dunnage) that are created by the machine 102 and can also determine the order in which packaging elements with certain characteristics are created (i.e., a manufacturing queue). In embodiments where the controller 104 is used with the FIB machine 152, the controller 104 may be used to control the length of each cushioning pillow, the amount of fill material deposited into the pillow, the type of fill material used, and the order and number of cushioning pillows that are created. Additionally, it should be noted that the features controlled by the controller 104, such as the sequences and queues, may be assigned to manual inputs to the machine 152 as well. For example, a foot pedal and/or the control panel 160 buttons may be assigned to match one or more buttons for the controller 104 so that the functionality of the manual inputs to the machine may correspond to the functionality of certain electronic inputs from the controller 104.

Figure 5A:
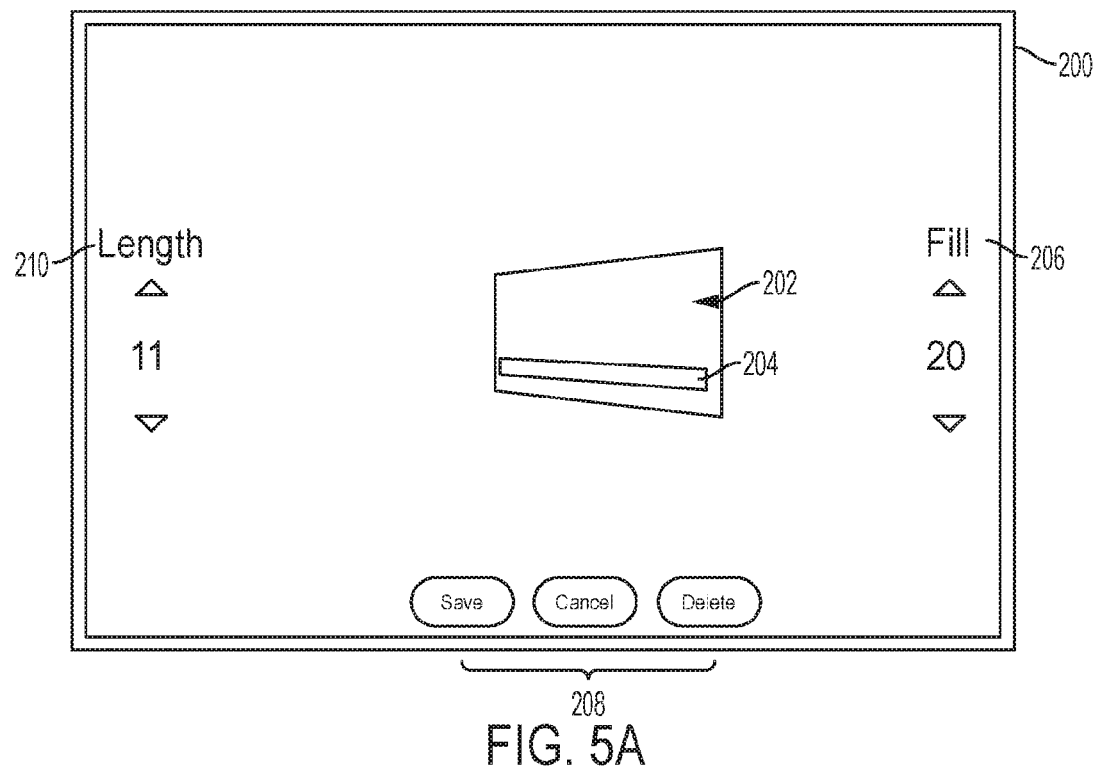
FIG. 5A is an image of an example of a custom element graphical user interface for the controller.
Figure 5B:
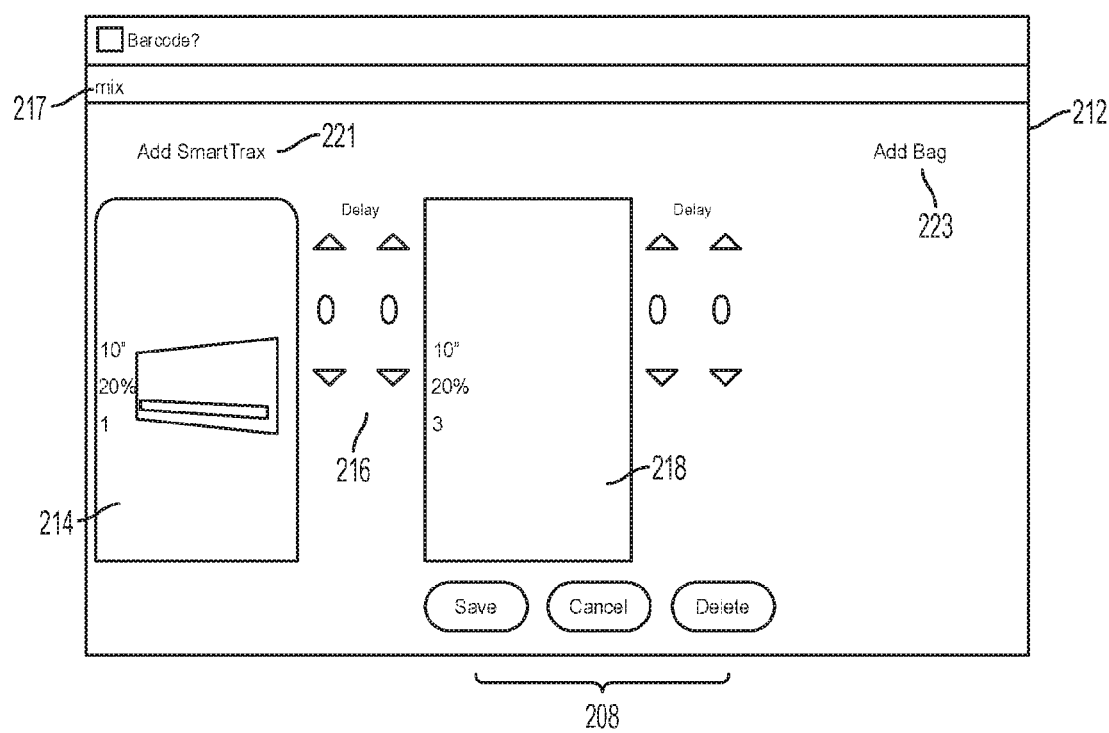
FIG. 5B is an image of an example of a custom sequence graphical user interface for the controller.

FIG. 5A is an illustrative image of a graphical user interface 200 for the controller 104 that allows a user to create a custom packaging element. With reference to FIG. 5B, in this embodiment, the individual element GUI 200 may include a bag icon 202 having a fill material graphic 204, as well as fill adjustment inputs 206, length adjustment inputs 210, and editing inputs 208. The bag icon 202 may be configured to correspond to the type of packaging element being created. For example, a foam-in-bag element and the fill material graphic 204 correspond to the percentage of fill material to be deposited. In this example, the fill material for the bag is set to 20% and so the fill material graphic 204 is shown as another color filling about 20% of the bag icon 202. This provides a visual indicator for the user that directly corresponds to the amount of fill material that will be used to inflate the bag. Additionally, although not shown in this example, the graphic selected for the fill material graphic 204 may include additional features depending on the type of bag, such as any connection points or columns defined in the bag (e.g., sealed portions that define different pillow configurations within the bag).

With continued reference to FIG. 5A, the fill adjustment inputs 206 allow a user to provide input to the controller 104 to vary the percentage fill for the bag. For example, a user may press the up arrow as displayed on the display 136 of the controller 104 to increase the fill percentage and the down arrow to decrease the fill percentage. It should be noted that the controller 104 may include minimum and/or maximum values for the fill percentage, so as to prevent a user from over or under filling a particular bag. However the minimum and maximum values may be adjusted or removed by a user with a desired access level (e.g., administrator, or the like).

Similarly, the length adjustment inputs 210 allow the user to increase or decrease the length of the bag. The length adjustment inputs 210 may corresponds to the length of the film that is cut by the cutting device (see machine 152). The length adjustment inputs 210 may be similar to the fill adjustment inputs 206 and a user may provide input to the controller 104 in a similar manner, but correspond to a different component of the machine 152. As with the fill adjustment inputs, the length adjustment inputs 210 may have minimum and/or maximum values that a typical user may not be able to exceed. Additionally, in some embodiments, the minimum and maximum values of the fill adjustment and the length adjustment may be tied together, i.e., as the bag length increases, the maximum fill percentage may increase and vice versa. As such, the minimum and maximum values for both the fill adjustment inputs 206 and the length adjustment inputs 210 may be dynamically variable.

The editing or control icons 208 allow the user to save the custom bag he or she has created by varying the fill percentage and length, cancel the custom bag operation, and/or delete the custom bag he or she has created or modified. The editing tasks and corresponding icons 208 may be varied as desired.

The custom bag settings created using the individual element GUI 200 may be saved and used by the controller 104 to upload to a queue and/or sequence of the machine 152 as will be discussed in more detail below.

An illustrative GUI for creating a sequence for the machine 152 will now be discussed. FIG. 5B is a screen shot of a custom sequence GUI 212. With reference to FIG. 5B, the custom sequence GUI 212 may include one or more item icons 214, 218, editing icons 208, a title 217, and delay icons 256. The item icons 214,218 correspond to items, such as bag configurations, custom bag settings, and optionally non-bag items (e.g., cleaning settings, film feed settings, and calibration). The item icons 214, 218 may include the bag icon 202 (or other icon corresponding to the selected item) and select information about the item, as shown in FIG. 5B, the length, fill percentage, and number of columns or pockets within each item. For example, a bag icon indicating a larger bag may have a larger configuration than a bag icon indicating a smaller bag. A bag icon may show a bag's programed fill percentage, for example, with a line across the bag (e.g., a line extending across the width of the bag and located 70% at the height of the bag to represent a bag with a 70% fill percentage), shading (e.g., shading extending across 70 of the bag's height to represent a bag with a 70% fill percentage), etc. In some instances, such as standard items or for non-bag items, the item icon 214, 218 may not include the bag icon 202.

The title 217 of the custom sequence GUI 212 allows a user to edit or input a title or name that corresponds to the custom sequence of items that he or she creates using the GUI 212. For example, the title 217 may allow a user to input a name and then using the editing buttons 208, the user can save the particular sequence of items in the controller 104 memory 134.

The sequence GUI 212 may also include adding icons 221,223 that allow a user to add additional items to the sequence, such as custom bags, standard bags, or the like. The adding icons 221, 223 may lead the user to another menu page that allows to select the features of the item to be added and/or select an item with previously stored characteristics (e.g., standard item or the item created via the item element GUI 200). After one of the adding icons 221,223 is selected, the item icon 214,218 corresponding to the selected item is added into the sequence order.

A custom sequence may be created using the custom sequence GUI 212 and when the user has arranged the items and delays as he or she wishes, the sequence can be stored in the memory 134 of the controller 104. As will be discussed below, the sequence may be selected and provided to the machine 152 as part of a queue for making packaging elements, where the machine goes through the sequence and creates the listed items and introduces delays between each item based on the sequence.

Figure 6:
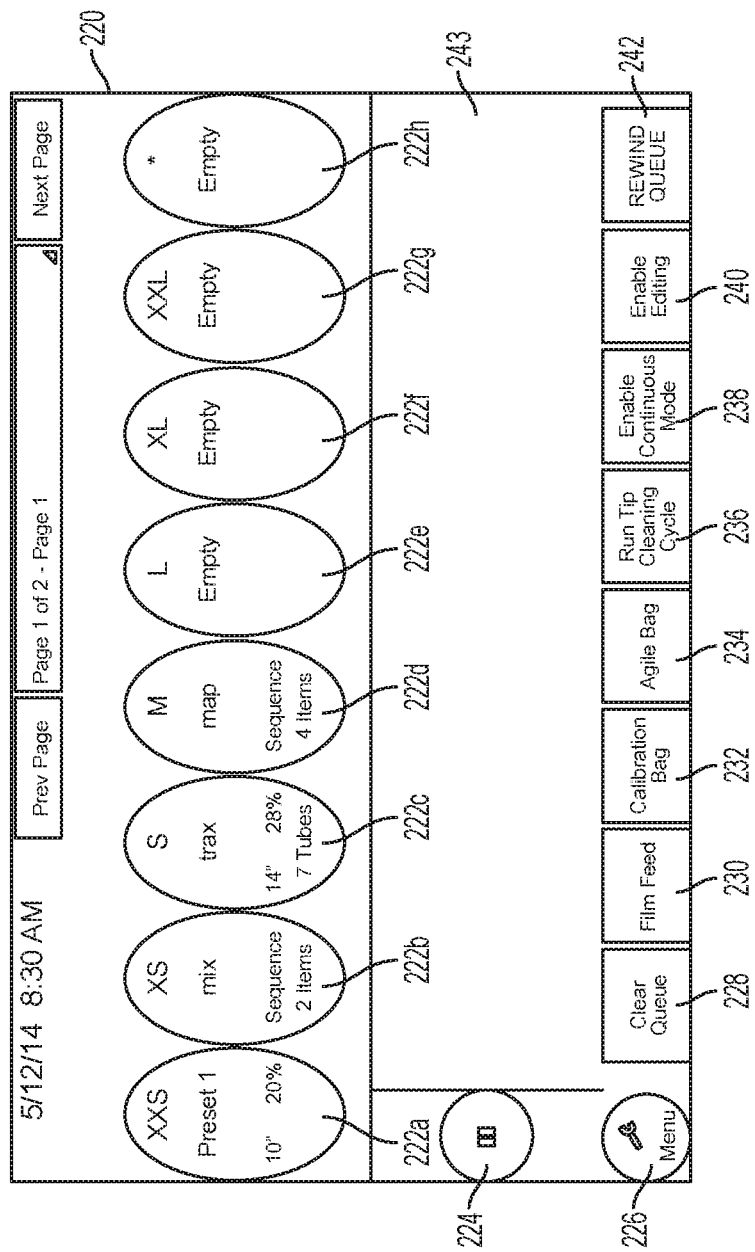
FIG. 6 is an image of an example of a queue graphical user interface.

A queue GUI for arranging the manufacturing queue for the machine 152 will now be discussed in more detail. FIG. 6 is a screen shot illustrating a queue GUI used to determine the order that cushioning items and some machine functions are completed. With reference to FIG. 6, the queue GUI 220 may include a plurality of queue element icons 222a-222h. The queue element icons 222a-222h correspond to items and/or sequences that may be added to the queue for the machine 152. For example, the queue element icons 222a-222h may be assigned to a particular item (either custom or standard) or may be assigned to a sequence (custom or standard). As will be explained in more detail below, by selecting one of the queue element icons 222a-222h, a user may determine the types of packaging elements and the order in which they are manufactured by the machine 152. Additionally the queue element icons 222a-222h are configured to correspond to the control panel 160 buttons and the functions of the queue element icons and the control panel buttons 160 may correspond to one another, i.e., the first control panel button may be a XXS bag, which may be the same type of bag characteristics selected when a user selects the first queue item icon 222a. In some embodiments the graphics of the GUI may be modified based on the assigned function for a particular icon. For example the queue element icons may change in color based on whether they have been assigned to a sequence, an item, or a default setting. Also, the icons may be editable by a user, so that a user can change the text displayed, the color, and optionally the shape.

The queue GUI 220 may also include a menu button 226 that allows a user to return to a home screen or previous menu screen. In other words, the menu button 226 exits the queue GUI 220 to allow a user to access other features of the controller 104.

The queue GUI 220 may also include one or more control buttons, such as a clear queue button 228, enable continuous mode 238, queue rewind 242, and an enable editing button 240. These buttons control the queue and the machine. For example, when the clear queue button 228 is selected, the queue that has been created is deleted and the items of the queue are removed from the line of the machine 152. When the enable continuous mode button 238 is selected, the queue selected by the user may be repeated for a predetermined number of loops. The enable editing button 240 may be selected to allow a user to make modifications to a queue that he or she has already created or may remove the editing ability to a specific queue.

The queue GUI 220 also includes an activation button 224. The icon displayed in the activation button 224 varies based on the state of the queue and the machine. When in "play" or "active" mode the queue is provided to the machine 152 which then manufactures the various items and within "pause" or "stop" mode, the machine 152 is stopped from manufacturing the items in the queue.

The queue GUI 220 may include a film feed button 230, a calibration bag button 232, an agile bag button 234, and a run tip cleaning cycle button 234. Each of these buttons 230,232, 236 may be added as items to a queue. The calibration bag button 232 activates a particularly configured bag that is used to calibrate the machine 152. The agile bag button 234 may be similar to the item buttons 222a-222h and may allow a user to customize a bag for the queue instantaneously. For example, rather than entering into the item GUI 200, the user can define the features of a bag while in the queue GUI 220.

The queue GUI 220 may also include a plurality of production step buttons, such as a pause icon 256 and a run tip cleaning cycle button 234, which may be added to the queue. The pause icons 256 may be positioned between each item icon 214,218. The pause icons 256 may be similar to the length and fill icons 206, 210 of the item GUI 200, but may correspond to a pause or time delay. For example, the pause icons 256 may include a numeric display and a set of arrows that allow a user to adjust the numeric display. The pause icons 256 correspond to a pause that is introduced into the machine 152 between each item. The pauses may be beneficial to allow the previous bag to be properly created, the components to be cooled/heated, cleaned, or the like. In instances where a pause is not required or desired, the pause may be set to 0.0 (as shown in FIG. 5B) and no pause may be part of the sequence.

When the run tip cleaning cycle button 236 is selected, a cleaning fluid, such as a solvent, may be administered (e.g., to the tips that administer the foam precursor) to remove debris from the tips. The tip cleaning cycle is run by the machine 152 in the order it is presented in the queue and is similar to other items in the queue, but rather than selecting characteristics of a bag, the tip cleaning cycle activates other components of the machine 152.

Figure 7A:
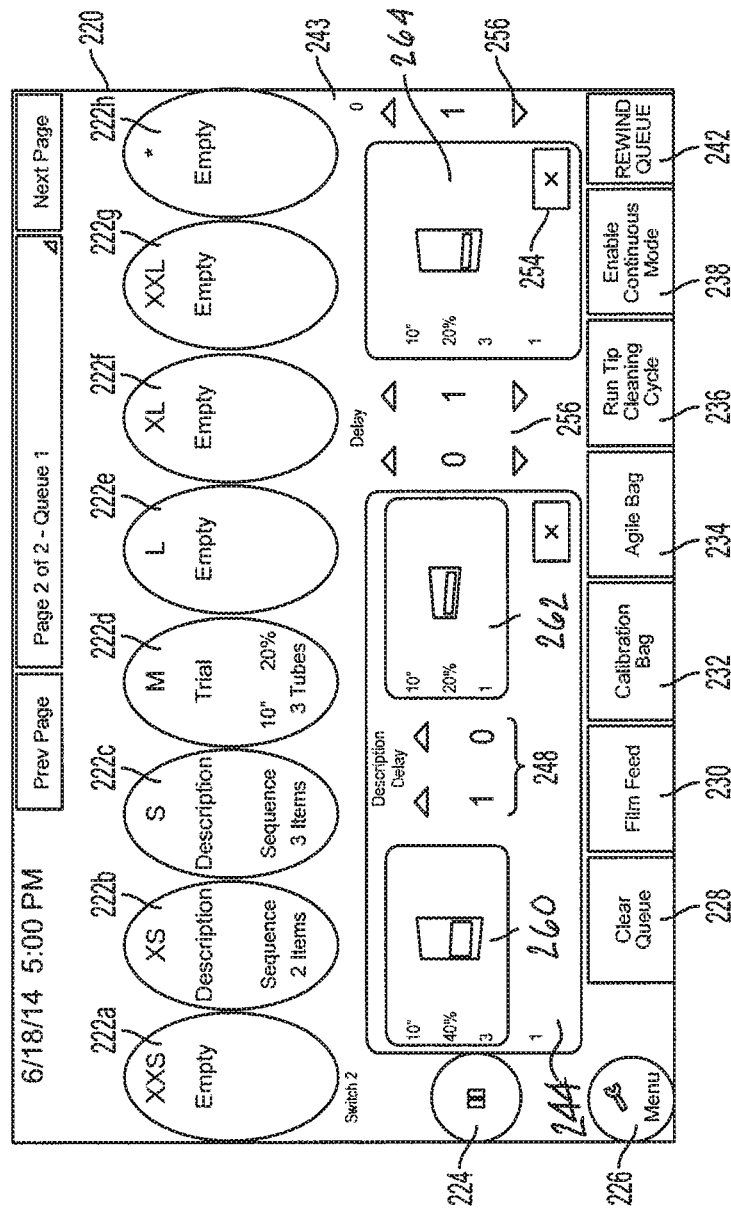
FIG. 7A is an image of the queue graphical user interface of FIG. 6 with a sequence and an item added to a queue pathway.
Figure 7B:
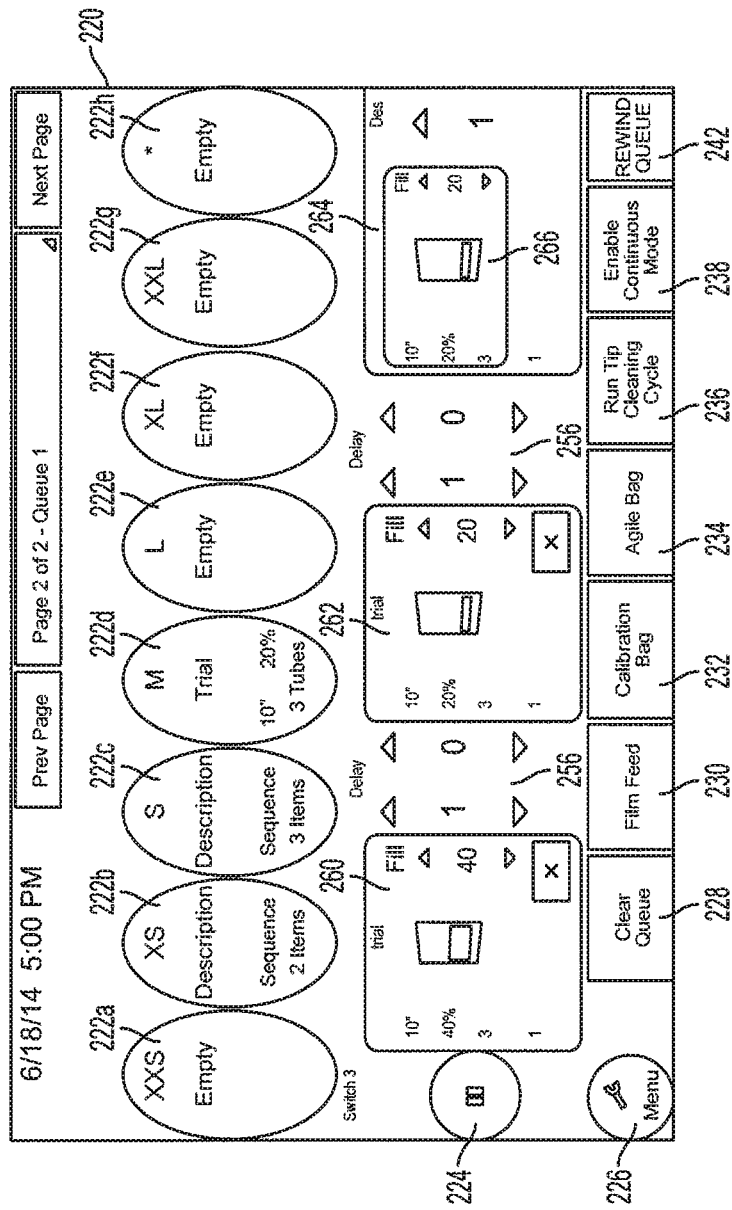
FIG. 7B is an image of the queue graphical user interface of FIG. 6 with two items and a sequence added to the queue pathway.

As will be discussed in more detail below, as items are added to the queue, the item icons are added to the queue pathway 243 on the queue GUI 220. This allows a user to view the order of the items within the queue and vary them if desired. For example, FIGS. 7A and 7B illustrate screen shots of the queue GUI 220. FIG. 7B shows items being added to the queue, and FIG. 7A shows the queue after it has been created. With reference to FIG. 7B, a first sequence 244 including two items 246, 250, and a delay of 1.0 seconds between each of the items 246, 250 is positioned closest to a first edge of the screen, a delay 256 is then added between the sequence 244 and the next items 252 in the queue. As shown in FIG. 7A, each of the items 260, 262, 264 in the queue, including the items 260, 262 in the sequence 244, include the item icon with relative information about each of the bags. When running this queue, the machine 152 would create the first item 260 in the sequence 244, pause for 1.0 seconds, create the second item 262 in the sequence, pause for 1.0 seconds and then create the last item 264 within the queue.

FIG. 7B shows the queue GUI 200 as a user creates the queue of FIG. 7A. As items 260, 262 are being created into sequence 244, the user has the opportunity to adjust parameters, such as fill percentage. The two items 262, 262 within sequence 244 are separated by delays 256 of 1.0 seconds; third item 264 is added to the queue pathway 243 after the addition of sequence 244.

Figure 7C:
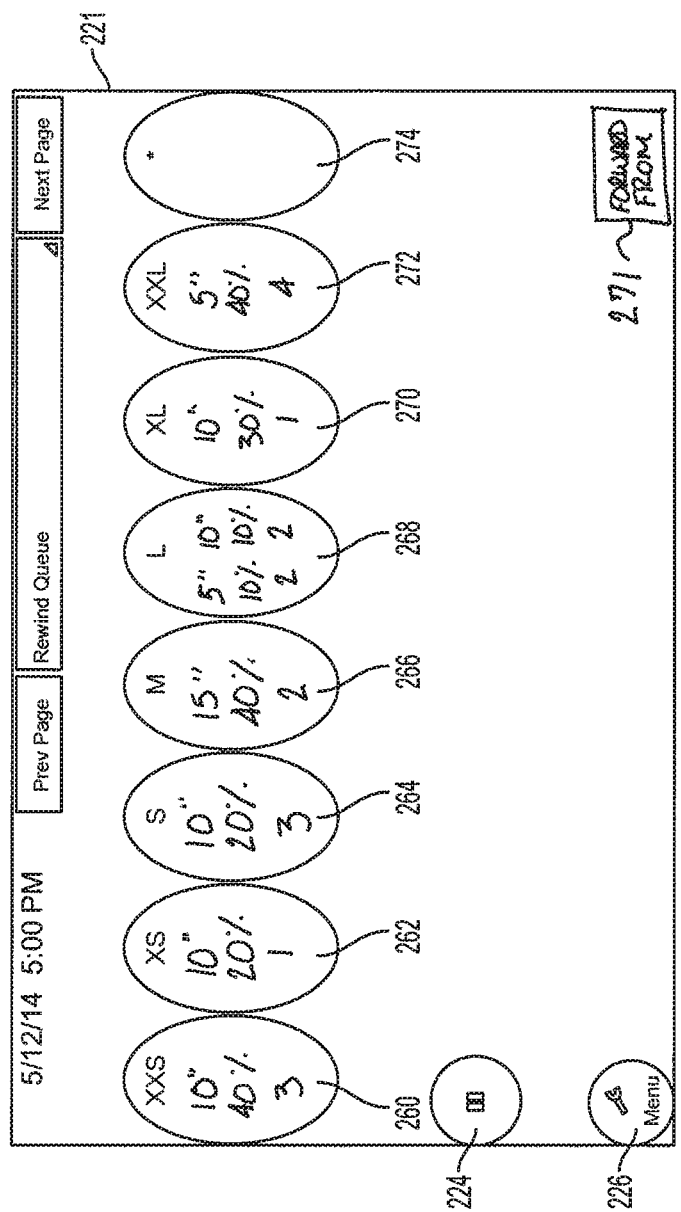
FIG. 7C is an image of a rewind queue graphical user interface.

With reference to FIG. 7A-7C, in some embodiments, the queue GUI 200 includes a rewind queue button 242 for initiating a rewind queue feature. During or after the running of a queue, a user can activate the rewind queue button 242 (e.g., on queue GUI 200), which prompts presentation of a rewind queue GUI 221 as shown in FIG. 7C. The rewind queue GUI 221 includes a plurality of previous item buttons 260-274 that identify items in the queue that were previously made. While FIG. 7C shows eight previous item buttons 260-274, the rewind queue GUI 221 can include any suitable number of previous item buttons 260-274 while remaining within the scope of this disclosure. A most recent button 274 can cause the packaging machine to remake a packaging unit (e.g., a FIB bag) that was most recently prompted by the queue. Other previous item buttons 260-272 can be presented on the rewind queue GUI 221 in the order in which they were produced via the queue. For example, a button 272 that is adjacent the most recent button 274 can cause the packaging machine to create another packaging unit that was second most recently prompted by the queue. Another button 270 that is adjacent the second most recent button 272 can cause the packaging machine to remake another packaging unit that was third most recently prompted by the queue, and so forth.

During or after the running of the queue, a user may activate a previous item button 260-274 to remake a packaging unit (e.g., an FIB bag) of the queue. Thus, if the user presses the most recent item button 274, the corresponding machine (e.g., machine 152) will recreate whichever packaging unit it most recently created. If the user presses the second most recent item button 172, then the corresponding machine (e.g., machine 152) will recreate whichever packaging unit it second most recently created. If the user presses a previous item button 260-274 during the running of the queue, then after recreating the selected packaging unit, the one or more machines will return to the running of the queue, and will make the next item in the queue.

The rewind queue feature allows a user to remake one or more particular packaging unit. Thus, a user can promptly and efficiently remake a packaging unit if the production and/or use of the packaging unit was defective. For example, sometimes a FIB bag expands to its full size before it is placed near the product to be packed and thus needs to be discarded. If a sequence has a number of different packaging unit and one or more of them need to be remade, the rewind queue feature allows a user to do so, without rerunning the entire sequence or having to reenter the specific parameters of the one or more packaging units.

In some embodiments, a user can rewind the queue from a particular place within the queue to cause the queue to pick up at the location and remake the items from that place. For example, as shown in FIG. 7C, the user can press "forward from" button 271 and then an item button (e.g., 264) to indicate a place from which to restart the queue. Upon the user selecting forward button and 271 and the item button 264, the queue restarts at item 264, so to remake item 264 and all the items forward from it in the queue (266, 268, 270, 272).

Figure 7D:
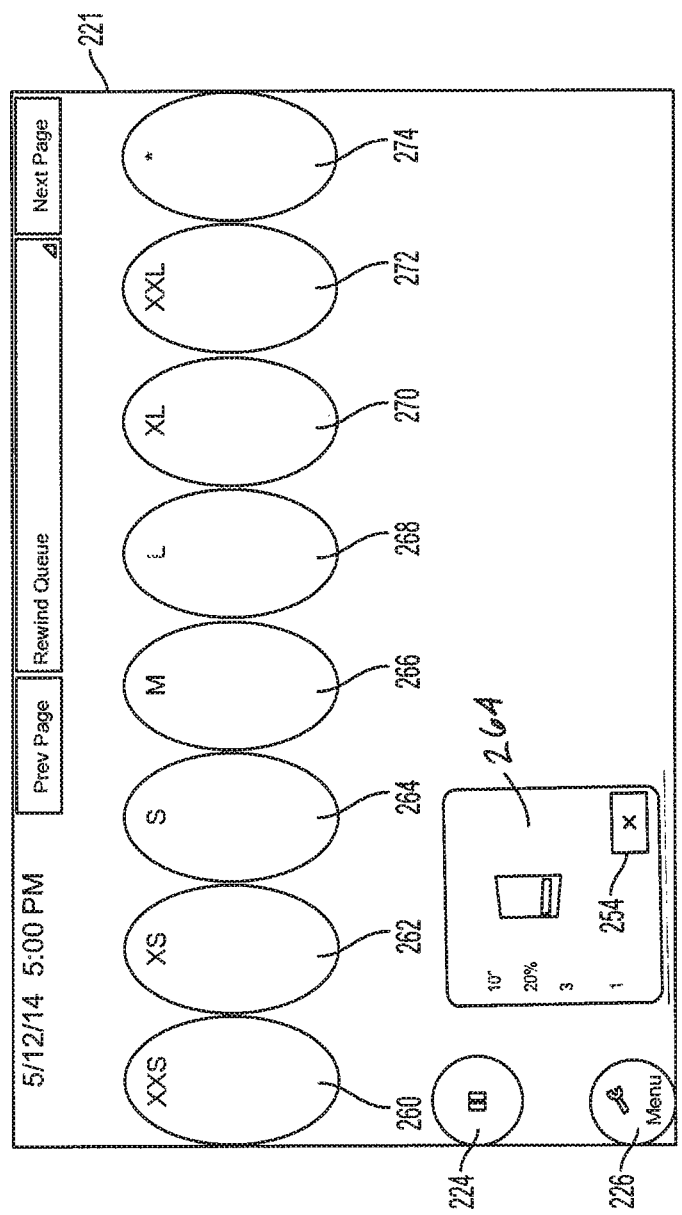
FIG. 7D is an image of a rewound queue graphical user interface.

FIG. 7D shows the GUI during a running of a rewound queue (e.g., after a user selects to rewind a portion of the queue via the rewind queue interface in FIG. 7C). FIG. 7D shows an example after the user selected to remake item 264. Thus, a visual indication of item 264 can be presented for display on the screen. If the user had selected to remake item 264 through the end of the original queue (e.g., if the user had selected the forward from button 271 and button 264), then shown on display would be a visual indication of items 264, 266, 268, 270, 273, and 274. In some embodiments, as the items of the queue are created, the graphical representation is dropped off and the presentation of the queue shifts (e.g., to the left). For example, the GUI presents graphical representations of items 264, 266, 268, and 270; and when creation of item 264 is complete, then the GUI presents graphical representations of items 266, 268, 270, and 272. Other suitable graphical user interfaces and/or inputs may be provided for providing the rewind queue functionality. As one example, instead of the forward from button, a user could double click on a button 264 to cause the packaging machine to remake the item 264 through the end of the queue.

In some embodiments, the processor retrieves, from a memory, a queue containing a plurality of sets of instructions, each set of instructions corresponding to parameters for forming unit of packaging material; causes a packaging machine to create a plurality of packaging units according to the parameters; receives user input corresponding to a rewind queue functionality; and rewinds the queue to cause the packaging machine to rerun a portion of the queue to cause the packaging machine to create some of the plurality of the packaging units.

Figure 8:
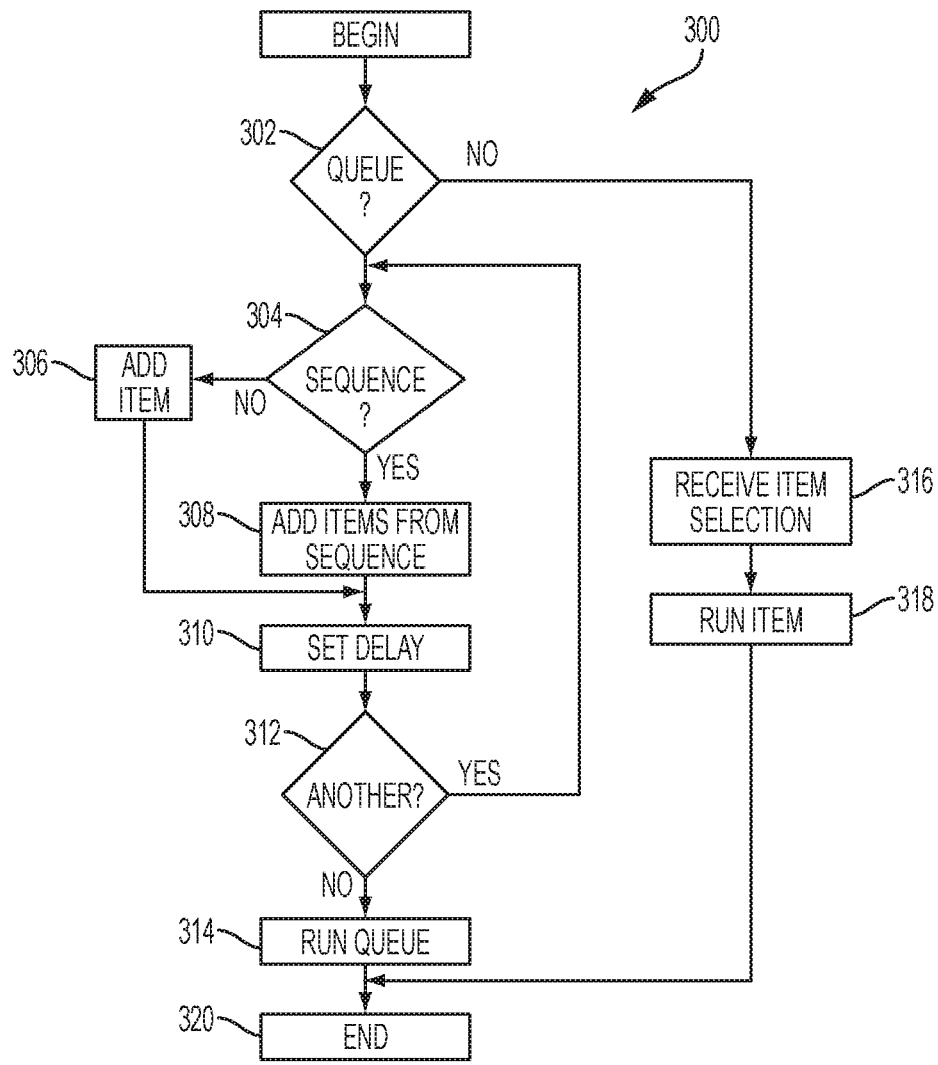
FIG. 8 is a flow chart illustrating a method for adding items to a queue for the machine of the packaging assembly of FIG. 4A.

An illustrative method for using the controller 104 to determine one or more queues for items for the machine will now be discussed in more detail. FIG. 8 is a flow chart illustrating a method for setting the queues for the machine 152. With reference to FIG. 8, the method 300 may begin with operation 302 and the controller 104 determines whether the operation of the machine will be queue based or instant. For example, the packaging assembly 100 may allow a user to select a button on the control panel 160 of the FIB machine 152 to activate the machine 152 to manufacture the selected item alternatively or additionally the controller 104 may include a button on the home screen or the queue GUI 220 which when selected to instruct the machine 152 to make an item, outside of the queue or rather than going through the queue process. This allows a user to choose to use the queue process or if a certain item is needed out of order or the like the user can select the instant process.

With continued reference to FIG. 8, if the queue process is not selected and the user wishes to use the instant process, the method 300 may proceed to operation 316. In operation 316, the machine 152 receives instructions from the controller 104 corresponding to the selected item. For example, the controller 104 provides the machine 152 with settings for certain components (e.g., pumps, rollers, cutting elements, and so on) that correspond to the item selected. Once the controller 104 has provided the machine 152 with the item selection data, the method 300 may proceed to operation 318 and the machine 152 runs to manufacture the item. For example, as described above, in the example of the FIB machine 152, the film is received into the machine where it is filled with sealed material and sealed in the desired locations to create a packaging element. After the item has been created, the method 300 may proceed to an end state 320.

If in operation 302, the queue process is selected, the method 300 may proceed to operation 304. In operation 304, the controller 104 determines whether a sequence is to be added to the queue. For example, the user may select one of the item icon buttons 222a-222h that may be assigned to a sequence or the user may select a custom sequence he or she has created. If a sequence is selected, the method 300 proceeds to operation 308 and the controller 104, in particular, the processing element 130, adds the items from the sequence into the queue for the machine 152. Additionally, with reference to FIG. 7A, the processing element 130 may instruct the display 136 to add the sequence icon 244 corresponding to the selected sequence to the queue pathway 243 to provide visual confirmation to the user that the selected sequence (and the items corresponding to that sequence have been added to the queue). Additionally, the queue pathway 243 provides visual feedback to the user regarding the position of the selected sequence within the queue for the machine 152.

If in operation 304 the sequence is not selected, the method 300 proceeds to operation 306. In operation 306, the processing element 130 adds the selected item (rather than sequences) to the queue for the machine and causes the corresponding item to be displayed in the queue pathway 243 on the queue GUI 220. As shown in FIG. 7B, the sequences GUI 220 will then display the corresponding item button 260 within the pathway in the order that they have been added to the queue. As discussed above, the film feed button 230, the calibration bag button 232, the agile bag button 234, and/or the tip cleaning cycle button 236 may also be added as items to the queue and may be displayed with a corresponding icon within the queue pathway 243.

With reference again to FIG. 8, after the corresponding items from either the sequence or the individual items have been added to the queue, the method 300 may proceed to operation 310. In operation 310, the processing element 130 receives input regarding a delay. For example the user may select the delay icon 256 by providing input to the controller 104 (e.g., touching the display 136) to increase or decrease the delay that will follow the recently added sequence or item. Once the user input has been received, the delay for the queue is set and is displayed in the queue pathway 243.

After the delay is set, the method 300 may proceed to operation 312. In operation 312, the controller 104 determines whether the user wishes to add another item to the queue. The controller 104 determines whether the user has hit the clear queue 228 or the activate button 224 to either delete the queue or run the queue, respectively. If neither of those inputs have been received, the method 300 may return to operation 304 and the controller 304 may determine whether a sequence button has been selected to add another sequence to the queue or whether an item button has been selected to add another item to the queue.

With continued reference to FIG. 8, if another item or sequences is not to be added to the queue, the method may proceed to operation 314. In particular, if the controller 104 receives input from the user to run the queue, such as by selecting the activation button 224, the queue will be sent to the machine 152 which will begin to create the items within the queue, in order. For example with reference to FIG. 7A, in this example, the queue includes a first sequence 244 having two items 246, 250 separated by a delay 248 and so the first item 246 will be created first, then the machine will pause for 1.0 second per the delay 248 and then proceed to make the next item 250. After the sequence has completed, the queue will advance to the delay 256, and then move to the next item in the queue 252. If the continuous mode button 238 is selected, the queue will repeat on a loop until the number of loops, number of items, or predetermined time has been reached. Alternatively, if the continuous mode is not selected the queue will run through each of the items in the queue pathway 243 until each has been created. Once the queue has completed, the method 300 may proceed to an end state 320 and the method may complete.

Figure 9:
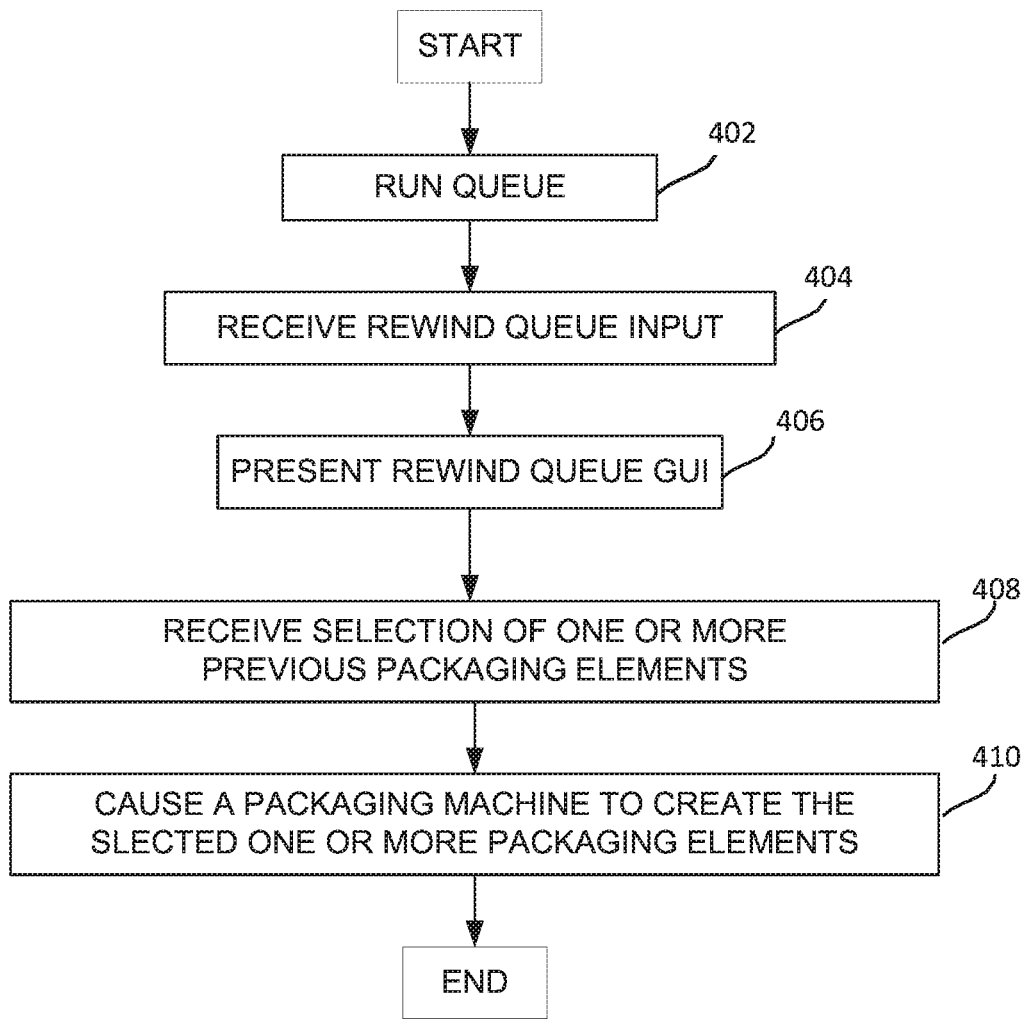
FIG. 9 is a flow chart illustrating a method for carrying out the rewind queue feature.

FIG. 9 is a flow chart illustrating a method for carrying out the rewind queue feature. In operation 402, the queue is run and the one more machines create the packaging elements according to the queue, as described above. In step 404, the controller 104 receives rewind queue input. For example, in embodiments, the user presses the rewind queue button 242 on the queue GUI 220. In response to receiving the rewind queue input, in operation 406, the controller 104 presents a rewind queue GUI 221, for example, as shown in FIG. 7C. In embodiments, the rewind queue GUI 221 includes a plurality of previous item buttons 260-272, each corresponding to a previously made packaging element, as described above with reference to FIG. 7C. In operation 408, the controller receives selection of one or more previously made packaging elements, for example, by receiving a user selection of the corresponding previous item buttons. Upon the selection, in operation 410, the controller 104 causes a packaging machine to create the selected one or more packaging elements. Thus, a user can rewind the queue to cause the packaging machine to rerun a portion of the queue to cause the packaging machine to create some of the plurality of the packaging units.

It should be noted that although the queues and sequences have been discussed with respect to the GUIs on the controller 104, in other embodiments the queues (and corresponding items/sequences) may be programmed to correspond to certain input buttons on the control panel 106 of the machine 102. This allows a user to automatically select a predetermined queue by selecting an input button on the controller panel 106, which means that the controller 104 may be used to program the machine and certain queues but may not be required for daily operation of the machine.

In operation, the controller 104 and/or a control panel 106 for a machine 102 may receive user input corresponding to one or more parameters for forming a plurality of packaging elements in a particular order. Based on this user input, the controller 104 and/or control panel 106 may create and store a queue. The controller 104 and/or the control panel 106 may use the stored queue to cause the machine 102 to create the plurality of packaging elements in the particular order.

A user may enter input corresponding to parameters for forming packaging elements. For example, if the machine is a FIB machine 102 and the user wants to create one first bag of a first size and having a first density, and two second bags of a second size and having a second density, the user may input parameters corresponding to the bags' sizes, fill percentages, and quantities. For example, the user may input data corresponding to one first bag having a first size and having a first fill percentage and data corresponding to a sequence of second bags, for example, two second bags having a second size and second fill percentages. The user may store these parameters as icons (e.g., icon 222c for the bag having the first size and icon 222d for the sequence of the two bags having the second size). For cases in which the user uses controller 104 to create queues, the user may activate these icons to add items and/or sequences to a queue. For example, the user could activate button 222c for adding the first bag and button 222d for adding the sequence of second bags to the queue. The user may also add a customized bag to the queue. For example, user may activate the agile bag button 234 to create a customized bag for the queue. The queue GUI 212 may include buttons allowing a user to select a quantity and/or spacing of secondary seals within the bag, to create a series of adjoining chambers filled with the foam.

This input for parameters for forming packaging elements may cause the controller 104 and/or control panel 106 to create a queue containing instructions for forming each of the packaging elements (e.g., first instructions for forming one first bag having the first size and fill percentage, and second instructions for forming the sequence of two second bags having the second size and the second fill percentage). The queue may indicate the order of forming the first bag and then the two second bags. For example, the queue may include information indicative of the order of forming the first and second bags (e.g., information that indicates: form the first bag, and then form the two second bags), and/or the manner in which the first and second instructions are stored in the queue may indicate the order of forming them (e.g., the first instructions may be written prior to the second instructions). Any suitable type and number of parameters corresponding to any suitable type and number of packaging elements may be added to the queue.

The queue may contain a stored set of instructions for creating a plurality of packaging elements having selected parameters, and the queue may indicate an order for forming the plurality of elements and/or timing parameters (e.g., pauses) associated with the packaging element creation. The queue may be used by the controller 104 and/or by the control panel 106 to cause the machine to create the plurality of packaging elements having the selected parameters. In some embodiments, the controller 104 and/or the control panel 106 may receive information that runs or activates the queue.

While discussion has been directed on selecting the length and/or fill percentage of packaging cushions, the queue may include instructions for controlling any suitable type of machine. The queue GUI 212 may include buttons corresponding to various types and configurations of packaging elements for controlling various types of machines (e.g., FIB machines, inflatable air cushion machines, paper dunnage machines, etc.). For example, the queue GUI 212 may include buttons corresponding to air cushions, and a user may select the size of bag, the amount of air to be inserted therein, whether the bag includes a seal of a valve, etc. The queue GUI 212 may include buttons allowing a user to select a quantity and/or spacing of secondary seals within an inflatable air cushion, to create a series of adjoining air chambers.

For example, the queue GUI 212 may include buttons for causing a paper dunnage machine to create paper dunnage. For example, the queue GUI 212 may include buttons for controlling parameters of one or more paper dunnage machines, such as a cutting mechanism to control the size of material to be cut, the speed and/or positions of one or more crumpling rollers and/or drums, etc. As such, a user can use the queue GUI 212 to cause one or more paper dunnage machines to create paper dunnage elements, similarly to the discussion on packaging elements.

When the queue is activated, the controller 104 and/or the control panel 106 may cause the instructions contained within the queue to be read so to create the plurality of packaging elements having the selected parameters. In some embodiments, the queue may be stored in the control panel 106. In some embodiments, the queue may be stored in the controller 104 and/or in external storage (e.g., cloud 122), and when the queue is triggered, the queue is sent to the control panel 106. The control panel 106 may parse the queue and read the instructions contained therein, causing the machine components to form the packaging elements according to the instructions.

The queue may be stored in the controller 104, the control panel 106 of the machine 102, and/or in an external database (e.g., cloud database 122). In some embodiments, the queue is stored in a control panel 106 of one or more of the machines 102, and when the queue is activated, the one or more machines 102 reads the instructions contained in the queue. In some embodiments, if the queue is stored in less than all of a plurality of machines 102, when the queue is activated, the one or more machine 102 that is storing the queue can send the queue to other machines 102 that do not have a stored queue. In some embodiments, the queue is stored in the controller 104 and/or in external storage (e.g., cloud 122), and when the queue is activated, the queue is sent to the control panel 106 of one or more of the machines 102. In some embodiments, the entire queue is sent to the control panel 106 (e.g., all of the instructions contained within the queue are sent to the control panel 106 together), which reads the instructions. In some embodiments, the instructions contained within the queue are sent separately to the one or more machines 102 (e.g., the controller 104 reads the queue and sends the instructions to the one or more machines 102).

In some embodiments, the queue is stored in the controller 104, which may selectively activate the queue based on user input or other types of inputs. Upon activating the queue, the controller 104 may parse the queue and read the instructions contained therein. Based thereon, the controller 104 may communicate with the one or more machines according to the timing and order associated with the queue. For example, in the scenario for creating a first FIB bag and then two second FIB bags, when the controller 104 activates the queue, the controller 104 may read the queue to determine the first instructions, the second instructions, and their order (e.g., first and then second). Thus, the controller 104 may send to the machine 102 (to the control panel 106 and/or to the drive mechanisms and/or other components of the machine 102) the first instructions, and then the second instructions. In some embodiments, the controller 104 may read the pause instructions, and based thereon, may wait a predetermined amount of time before sending the second instructions. In some embodiments, the pause instructions may be read by the control panel 106. For example, the pause instructions may cause the control panel 106 to pause between sending information to the drive mechanisms and/or other components of the machine 102.

These queues may be stored and later retrieved and used by the machine 102. For example, if a packaging facility packs on a regular basis similarly shaped items with a particular set of packaging elements, a user may store a queue associated with the set of packaging elements. The user may enter input that associated the stored queue with one or more buttons controller 104 and/or control panel 106. Thus, when a user desires to pack an item using the set of packaging elements, the user can simply activate the button on the controller 104 and/or control panel 106, which may cause trigger the queue. The queue instructions may be read and used to cause the machine 102 to create the set of packaging elements.

As explained above, the queue may contain instructions for controlling any suitable number and type of packaging machines 102. For example, a user may add to the queue third instructions for forming an air filled cushion by an air pillow machine 112, having a selected size and/or containing a selected amount of air. For cases in which the queue is run by the controller 104, in some embodiments, the controller may determine, for each set of instructions within the queue, which machine (e.g., 102, 112) is to receive the instructions. In some embodiments, the controller 104 may send all of the instructions to all of the machines. For cases in which the queue is run by a machine (e.g., 102, 112), in some embodiments, a machine (e.g., 102) may parse the queue and send instructions contained in the queue to one or more other machines (e.g., 112).

Stored queues may be updated, for example, via network. For example, a packaging facility may employ several queues that contain instructions for a small FIB element that is filled 40% with foam. It may become known that the functionality of the cushion is not noticeably diminished if it is filled only 35% with foam precursor, and/or the chemical composition of the foam precursor may be altered so that less chemical substance is needed. Thus, a user may update some or all of the queues (e.g., within network) having instructions for a creating a small FIB element filled 40% so that the instructions instead cause the machine 102 to produce a small FIB element that is 35% filled with foam precursor. For example, in cases when the queues are stored in an external database (e.g., cloud database 122) the instructions contained in the queues may be changed and/or modified. As such, the queues may be controlled an updated, for example, as analytics data develops, or as new technology is introduced. The queues may allow different levels of access by different users. For example, a first user (e.g., an upper level employee) may be allowed to create, program, update and/or modify the queues, while a second user (e.g., a lower level employee, such as an operator of a packaging machine) may not be allowed to modify the queues, but may only be allowed to run particular queues.

The foregoing description has broad application. For example, while examples disclosed herein may focus on packaging machines, it should be appreciated that the concepts disclosed herein may equally apply to substantially any other type of machine that is used for manufacturing elements or components. Accordingly, the discussion of any embodiment is meant only to be exemplary and is not intended to suggest that the scope of the disclosure, including the claims, is limited to these examples.

What is claimed is:

1. A control device, comprising a processor and a memory, the memory containing computer readable instructions that, when executed by the processor, cause the processor to:
   retrieve, from a memory, a queue containing a plurality of sets of instructions, each set of instructions corresponding to parameters for forming a unit of packaging material;
   cause a packaging machine to create a plurality of packaging units according to the parameters;
   receive user input corresponding to a rewind queue functionality; and
   rewind the queue to cause the at least one packaging machine to rerun a portion of the queue and create some of the plurality of the packaging units during the rerun.

2. The device of claim 1, further comprising a packaging machine in communication with the processor.

3. The device of claim 2, wherein the packaging machine is a first packaging machine, and the device further comprises a second packaging machine, wherein the first packaging machine creates at least one of the plurality of packaging units, and the second packaging machine creates at least one other of the plurality of packaging units.

4. The device of claim 1, wherein a first unit of packaging material created by the packaging machine comprises different material than a second unit of packaging material created by the packaging machine.

5. The device of claim 1, further comprising a display, wherein the computer readable instructions further cause the processor to:
   display on the display a first item graphic corresponding to a first unit of packaging material, wherein one or more characteristics of the first item graphic correspond to parameters of the first unit of packaging material; and
   display on the display a second item graphic corresponding to a second unit of packaging material, wherein one or more characteristics of the second item graphic correspond to parameters of the second unit of packaging material.

6. The device of claim 5, wherein the first item graphic and second item graphic are presented together on the display in an order that indicates that the packaging machine will create the first unit of packaging material before creating the second unit of packaging material.

7. The device of claim 1, wherein the computer readable instructions further cause the processor to:
   receive a user pause input corresponding to a pause for a predetermined length of time; and based on the pause input, send pause information to the packaging machine, to cause the packaging machine to create the first unit of packaging material, pause for the predetermined length of time, and create the second unit of packaging material.

8. The device of claim 1, wherein the instructions further cause the processor to send cleaning information to the packaging machine to cause a cleaning material to be applied to the packaging machine after the packaging machine creates the first unit of packaging material.

9. The device of claim 1, wherein:
the packaging machine is a foam-in-bag machine;
the first unit of packaging material includes a bag having a predetermined amount of foam filled therein; and
the parameters corresponding to the first unit of packaging material include at least one of a length of the bag or a percentage of the bag to be filled with foam.

10. A system for controlling the manufacturing of packaging material, comprising:
a controller for retrieving a queue containing a plurality of instructions, each of the plurality of instructions corresponding to parameters for forming a unit of packaging material; and
a packaging machine for receiving the plurality of instructions and creating a plurality of packaging units according to the plurality of instructions;
wherein the controller receives a rewind queue command, and the packaging machine receives instructions associated with the rewind queue command that cause the packaging machine to create at least one additional unit of packaging material according to at least a portion of the queue.

11. The system of claim 10, wherein the controller further comprises:
an input for receiving user input corresponding to the plurality of instructions in the queue and corresponding to the rewind queue command.

12. The system of claim 11, wherein the controller further comprises:
a memory in communication with the input, the memory being for storing computer readable instructions corresponding to the plurality of instructions in the queue and corresponding to the rewind queue command.

13. The system of claim 12, wherein the controller further comprises:
a processor in communication with the input and the memory, the processor configured to execute the computer readable instructions to cause the packaging machine to create the plurality of packaging units according to the queue and create the at least one additional unit of packaging material according to the at least a portion of the queue.

14. The system of claim 13, wherein the controller further comprises:
a display;
wherein the input is part of the display; and
the display presents a user interface that allows a user to input instructions into the queue and trigger the rewind queue command.

15. The system of claim 14, wherein the display and input are configured as a touch screen.

16. The system of claim 14, wherein the user interface presents a rewind queue button corresponding to the rewind queue command to the user, and when the rewind queue button is selected by the user the rewind queue command is triggered.

17. The system of claim 13, wherein the input receives a first user input corresponding to first instructions for forming a first unit of packaging material;
the processor adds the first instructions to the queue;
the input receives a second user input corresponding to second instructions for forming a second unit of packaging material; and
the processor adds the second instructions to the queue.

18. The system of claim 10, wherein the rewind queue command is configured such that when the rewind queue command is received, the packaging machine reruns the instructions for a most recent unit of packaging material created by the packaging machine.

19. The system of claim 10, wherein the rewind queue command is configured such that when the rewind queue command is received while the packaging machine is creating a first unit of packaging material, execution of the queue is paused, the packaging machine creates an additional unit of packaging material according to parameters corresponding to the first unit of packaging material, and then execution of the queue is resumed.

20. The system of claim 10, wherein the rewind queue command is configured such that when the rewind queue command is received while the packaging machine is creating the first unit of packaging material, an additional item having parameters equivalent to the parameters of the first item is added to the queue without interrupting the queue.

21. The system of claim 10, wherein the rewind queue command includes a forward from instruction defining a position in the queue from which the queue will be rerun.

22. The system of claim 21, wherein the rewind queue command is generated by a user input indicating an item in the queue, and without any additional input from the user, the packaging machine receives and executes the rewind queue command with the forward from instruction indicating that the position in the queue from which the queue is to be rerun is a position of the indicated item in the queue.

23. A method of creating units of packaging material, comprising the steps of:
retrieving a queue containing a plurality of sets of instructions, each set of instructions corresponding to a unit of packaging material;
creating by a packaging machine a plurality of packaging units according to the plurality of sets of instructions in the queue;
receiving a rewind queue command from a user; and
creating by the packaging machine at least one unit of packaging material according to at least one of the plurality of sets of instructions in at least a portion of the queue, the at least a portion of the queue being indicated by the rewind queue command.

* * * * *